United States Patent
Demerly et al.

(10) Patent No.: US 6,687,588 B2
(45) Date of Patent: Feb. 3, 2004

(54) COMPENSATION USING POSITION FOR IMPROVED FEEL AND STABILITY IN A STEERING SYSTEM

(75) Inventors: Jon D. Demerly, Byron, MI (US); Farhad Bolourchi, Novi, MI (US); Scott A. Millsap, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/231,892

(22) Filed: Aug. 30, 2002

(65) Prior Publication Data
US 2003/0055546 A1 Mar. 20, 2003

Related U.S. Application Data

(60) Provisional application No. 60/322,014, filed on Sep. 14, 2001.

(51) Int. Cl.[7] .................................................. B62D 5/04
(52) U.S. Cl. .......................... 701/41; 701/42; 180/402; 180/443; 318/432; 318/434
(58) Field of Search ..................... 701/41, 42; 180/402, 180/443; 318/432, 434

(56) References Cited

U.S. PATENT DOCUMENTS

| 4,800,974 A | 1/1989 | Wand et al. ................ 180/79.1 |
| 4,860,844 A | 8/1989 | O'Neil ....................... 180/79.1 |
| 4,869,335 A | 9/1989 | Takahashi ................... 180/140 |
| 4,951,199 A | 8/1990 | Whitehead ............. 364/424.05 |
| 5,001,637 A | 3/1991 | Shiraishi et al. ....... 364/424.05 |
| 5,044,956 A | 9/1991 | Behensky et al. ............ 434/45 |
| 5,228,757 A | 7/1993 | Ito et al. ..................... 303/100 |
| 5,251,135 A | 10/1993 | Serizawa et al. ...... 364/424.05 |
| 5,257,828 A | 11/1993 | Miller et al. ............... 180/79.1 |
| 5,307,892 A | 5/1994 | Phillips ..................... 180/79.1 |
| 5,338,250 A | 8/1994 | Swilley et al. .............. 452/136 |
| 5,347,458 A | 9/1994 | Serizawa et al. ...... 364/424.05 |

(List continued on next page.)

FOREIGN PATENT DOCUMENTS

| EP | 0278366 B1 | 2/1988 | ............ B62D/6/00 |
| EP | 0 278 366 B1 | 3/1991 | ............ B62D/6/00 |
| EP | 0 858 408 B1 | 10/1996 | ............ B62D/5/06 |
| EP | 0 985 591 A2 | 8/1999 | ............ B62D/5/06 |
| GB | 2341588 A | 2/2000 | ............ B62D/5/32 |
| GB | 2 341 588 A | 3/2000 | ............ B62D/5/32 |
| JP | 60-259570 | 12/1985 | ............ B62D/7/14 |
| JP | 1-115778 | 10/1987 | ............ B62D/7/14 |
| JP | 8-34353 | 2/1996 | ............ B62D/1/12 |
| WO | WO 00/34106 | 6/2000 | ............ B62D/1/06 |

OTHER PUBLICATIONS

J.Y. Wong, Ph.D., "Chapter Five: Handling Characteristics of Road Vehicles," *Theory of Ground Vehicles*, 1978, pp. 210–214.

(List continued on next page.)

Primary Examiner—Michael J. Zanelli
Assistant Examiner—Eric M Gibson
(74) Attorney, Agent, or Firm—Michael D. Smith

(57) ABSTRACT

Disclosed herein is steer-by-wire control systems comprising: a road wheel unit responsive to a road wheel command signal including a road wheel position sensor and a road wheel force sensor. The steer-by-wire control system also includes a steering wheel unit responsive to a steering wheel torque command signal, including a steering wheel position sensor and a torque sensor. The steer-by-wire control system further includes a vehicle speed sensor, and a master control unit operatively connected to the vehicle speed sensor, the steering wheel unit, and the road wheel unit. The steering wheel unit is also responsive to the steering wheel position signal.

103 Claims, 22 Drawing Sheets

U.S. PATENT DOCUMENTS

| | | | |
|---|---|---|---|
| 5,374,877 A | 12/1994 | Imaseki et al. | 318/34 |
| 5,429,548 A | 7/1995 | Long et al. | 452/127 |
| 5,449,199 A | 9/1995 | Heinrichs et al. | 280/775 |
| 5,475,289 A | 12/1995 | McLaughlin et al. | 318/432 |
| 5,513,720 A | 5/1996 | Yamamoto et al. | 180/141 |
| 5,576,957 A | 11/1996 | Asanuma et al. | 364/424.05 |
| 5,653,304 A | 8/1997 | Renfroe | 180/402 |
| 5,668,722 A | 9/1997 | Kaufmann et al. | 701/41 |
| 5,704,446 A | 1/1998 | Chandy et al. | 180/446 |
| 5,717,590 A | 2/1998 | Mihalko | 364/424.051 |
| 5,719,766 A | 2/1998 | Bolourchi et al. | 364/424.052 |
| 5,740,040 A | 4/1998 | Kifuku et al. | 364/424.05 |
| 5,765,116 A | 6/1998 | Wilson-Jones et al. | 701/41 |
| 5,774,819 A | 6/1998 | Yamamoto et al. | 701/41 |
| 5,828,972 A | 10/1998 | Asanuma et al. | 701/141 |
| 5,829,547 A | 11/1998 | Fujii et al. | 180/422 |
| 5,890,081 A | 3/1999 | Sasaki | 701/37 |
| 5,913,375 A | 6/1999 | Nishikawa | 180/168 |
| 5,925,083 A | 7/1999 | Ackermann | 701/41 |
| 5,957,987 A * | 9/1999 | Sudo et al. | 701/41 |
| 6,018,691 A | 1/2000 | Yamamoto et al. | 701/41 |
| 6,055,467 A | 4/2000 | Mehring et al. | 701/23 |
| 6,059,068 A * | 5/2000 | Kato et al. | 180/402 |
| 6,076,627 A | 6/2000 | Bohner et al. | 180/422 |
| 6,079,513 A | 6/2000 | Nishizaki et al. | 180/402 |
| 6,097,286 A | 8/2000 | Discenzo | 340/465 |
| 6,098,296 A | 8/2000 | Perisho, Jr. et al. | 33/203 |
| 6,102,151 A | 8/2000 | Shimizu et al. | 180/446 |
| 6,152,254 A | 11/2000 | Phillips | 180/422 |
| 6,154,695 A | 11/2000 | Shimizu et al. | 701/41 |
| 6,173,221 B1 * | 1/2001 | Boehringen et al. | 701/41 |
| 6,176,341 B1 | 1/2001 | Ansari | 180/402 |
| 6,179,394 B1 | 1/2001 | Browalski et al. | 303/146 |
| 6,208,923 B1 | 3/2001 | Hommel | 701/42 |
| 6,209,677 B1 | 4/2001 | Bohner et al. | 180/406 |
| 6,213,248 B1 * | 4/2001 | Kawaguchi et al. | 180/446 |
| 6,219,604 B1 | 4/2001 | Dilger et al. | 701/41 |
| 6,240,350 B1 | 5/2001 | Endo | 701/41 |
| 6,244,372 B1 | 6/2001 | Sakamaki et al. | 108/422 |
| 6,279,674 B1 | 8/2001 | Lissel et al. | 180/402 |
| 6,279,675 B1 | 8/2001 | Bohner et al. | 180/403 |
| 6,283,243 B1 | 9/2001 | Bohner et al. | 180/406 |
| 6,285,936 B1 | 9/2001 | Bohner et al. | 701/41 |
| 6,363,305 B1 | 3/2002 | Kaufmann et al. | 701/41 |
| 6,370,460 B1 | 4/2002 | Kaufmann et al. | 701/41 |
| 6,450,287 B1 * | 9/2002 | Kurishige et al. | 180/446 |
| 2002/0084757 A1 | 7/2002 | Ewbank et al. | 318/34 |
| 2002/0107621 A1 | 8/2002 | Byers et al. | 701/41 |

OTHER PUBLICATIONS

A. Wiley—Interscience Publication; John Wiley & Sons; "Theory Of Ground Vehicles"; J.Y. Wong, Ph,D.; 1978; pp. 210–214.

* cited by examiner

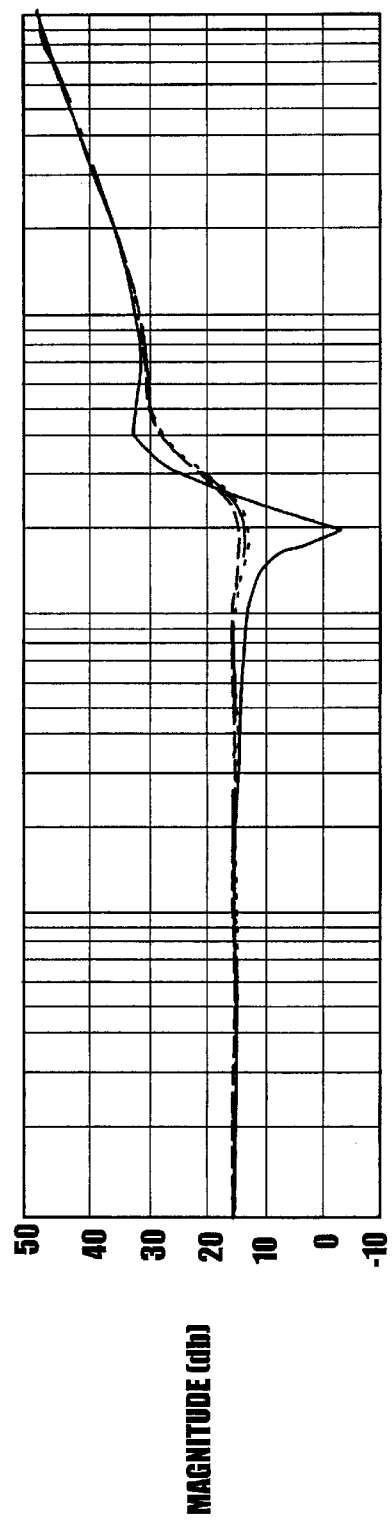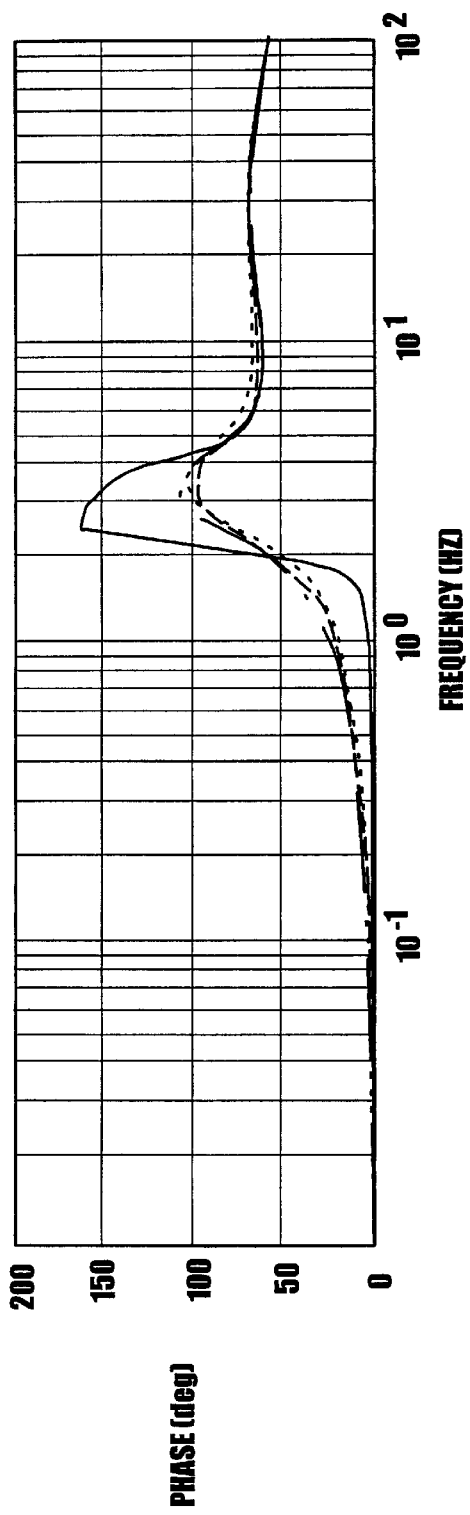
FIG. 15

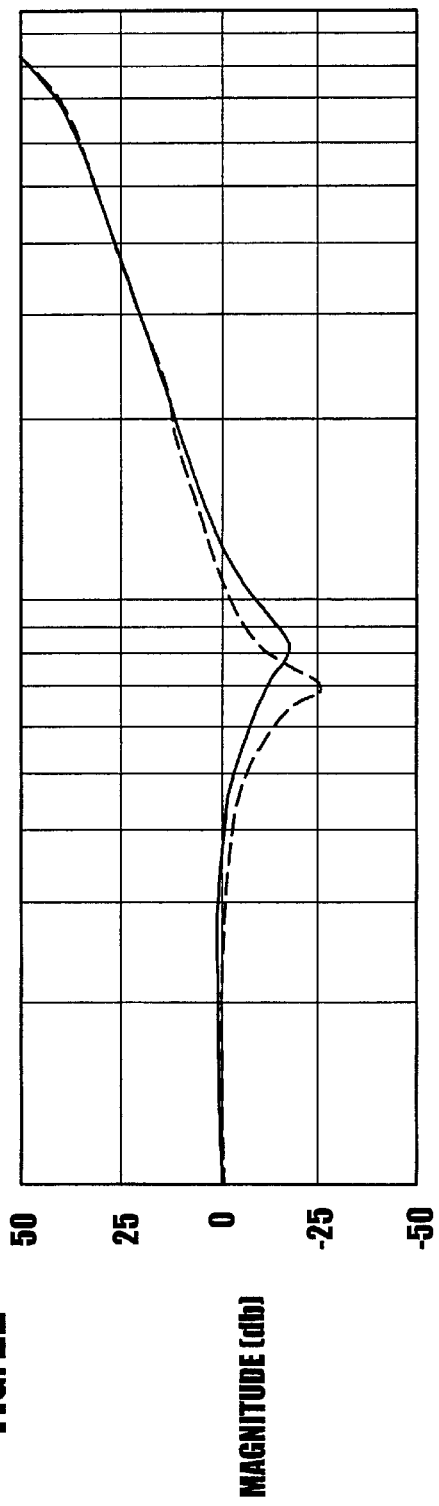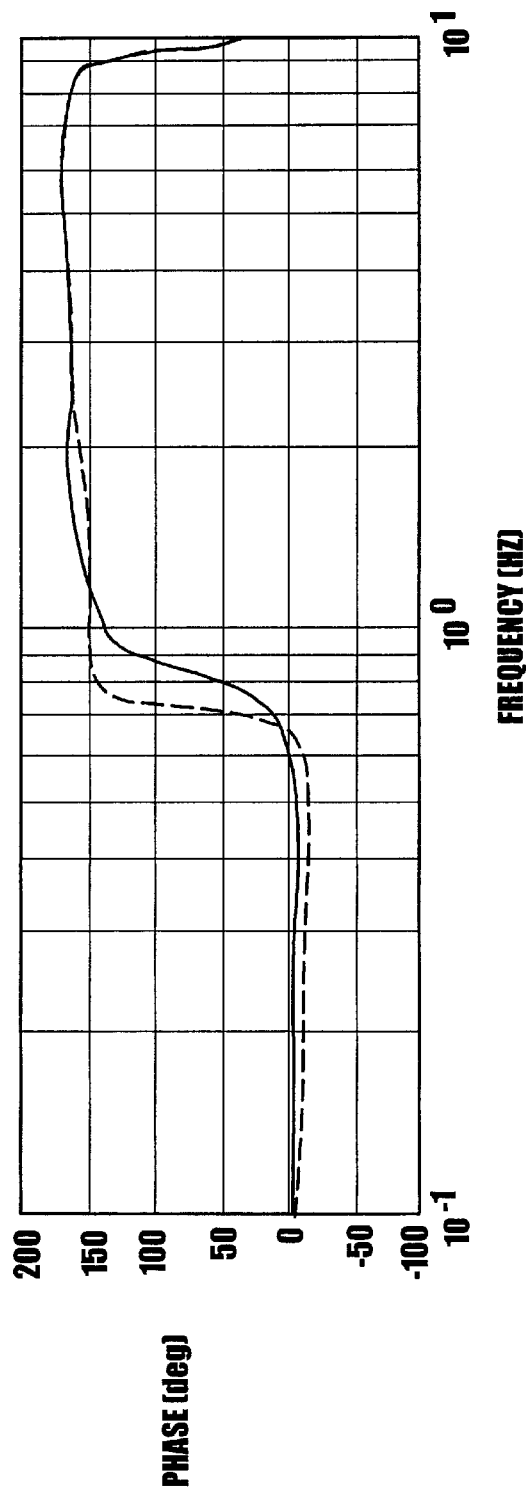
FIG. 22

COMPENSATION USING POSITION FOR IMPROVED FEEL AND STABILITY IN A STEERING SYSTEM

CROSS-REFERENCE TO RELATED APPLICATIONS

This application claims the benefit of U.S. provisional application No. 60/322,014, filed Sep. 14, 2001 the contents of which are incorporated by reference herein in their entirety.

BACKGROUND

Steering equipment for assisting a driver to steer an automobile is well known in the art. In conventional steering assemblies, the operator controls the direction of the vehicle with the aid of a steering wheel. This wheel is mechanically connected, usually through a gear assembly to the road wheels. To aid the operator, many systems utilize an auxiliary system to generate a force that is transmitted to a steering gear assembly. The additional force reduces the effort required by the operator in changing the direction of the vehicle. Typically, this auxiliary force is generated by either a hydraulic drive or an electric motor.

One advantage in having a direct connection is that the operator receives tactile feedback through the steering wheel. For example, if the vehicle changes directions while it is moving, the operator will feel resistance in the steering wheel.

With a steer-by-wire system, since the mechanical link between the steering wheel and the road wheels is eliminated, some potential problems arise when trying to get the system to have the right feel e.g., tactile feedback to the driver. At the same time, since there is no longer a mechanical connection, what the driver feels at the steering wheel is highly tunable. One issue with the elimination of the mechanical connection is that the relationship between the driver's steering wheel angle input and the torque felt by the driver can change significantly. This change can cause the system to have poor steering feel and may have a destabilizing effect on the system.

A typical steer-by-wire system uses steering wheel position information in order to control the position of the road wheels. Then the forces at the road wheels are measured and used to provide the feedback torque to the driver. This approach results in driver steering wheel position and the resulting torque felt by the driver being largely decoupled. From a steering feel perspective, there is a desirable relationship between steering wheel angle and steering wheel torque. This relationship is not guaranteed and actually may not even be possible using only feedback of the forces from the road wheels to determine steering wheel torque. There is also a desirable torque magnitude felt by the driver (as a function of input frequency). As the magnitude of this desired torque goes up the chance for instability increases especially once the driver removes his hands. This is due to the fact that the torque provided by the motor to achieve the desired feel is being balanced (in off-center and steady state sense) with the driver's effort. Once the driver removes his hands, however, the torque provided by the motor accelerates the steering wheel to center and possibly overshoots, depending on the magnitude of the initial torque. As this overshooting action is taking place, the hand wheel system sends the corresponding position signal to the road wheels, and the road wheels return to center. However, due to lack of a driver resistance (and thus a hand wheel overshoot,) the road wheels overshoot, as well. Therefore, the road wheel forces switch direction, and thus, the steering wheel motor switches the direction of its torque (in response to the sensed road wheel forces). This causes the hand wheel to come back to center (from the opposite off-center position now), and an overshoot of center may take place, again. The excessive overshoot and oscillations is known as "Free Control Oscillation". Since these oscillations are due in part to lack of resistance by the driver, it is reasonable to add some kind of resistance in the hand wheel actuator to control this system.

Conventional position control of actuators, servos, and the like often utilize a feedback control system to regulate or track to a desired position. The control law may be a proportional, integrative or derivative gain on the tracking error or may be a more sophisticated higher-order dynamic. In either case, the feedback measurement is the actual position and in some cases, it's derivatives.

This mechanism is sufficient for most applications where the load on the system has a predictable relationship to the system position (rotational or translational). In control system terms, this could be predicted by the location of the poles and zeros of the system or frequency response. A conventional control system could then be designed based on these dynamics.

However, in many systems, the load varies based on operating conditions even with the position and its derivatives kept the same. For example in automotive steering applications, the load on the steering system changes as a function of the road surface, operation (lateral acceleration, vehicle speed etc) and tire properties. In such cases, the conventional control design is optimal for a given operating condition, but has reduced performance as the conditions change.

Therefore, is it considered advantageous to provide a steering control system, which addresses the load on the system while still providing the assist forces and tactile feedback for the operator and reducing free control oscillation.

BRIEF SUMMARY

A steer-by-wire control system comprising: a road wheel unit responsive to a road wheel command signal for steering a vehicle, the road wheel unit includes a road wheel position sensor to produce and transmit a road wheel position signal and a road wheel force sensor to produce and transmit a road wheel force signal. The steer-by-wire control system also includes a steering wheel unit responsive to a steering wheel torque command signal, the steering wheel unit includes a steering wheel position sensor to produce and transmit a steering wheel position signal and a torque sensor to produce and transmit a feedback torque sensor signal. The steer-by-wire control system further includes a vehicle speed sensor to produce and transmit a vehicle speed signal, a master control unit operatively connected to the vehicle speed sensor, the steering wheel unit, and the road wheel unit. The road wheel unit is also responsive to the road wheel force signal and/or the steering wheel unit is also responsive to the steering wheel position signal.

A method for steering a vehicle with a steer-by-wire system comprising: receiving a road wheel force signal, a road wheel position signal, a vehicle speed signal, a steering wheel position signal, and a feedback torque sensor signal. The method for steering a vehicle also includes generating a steering wheel torque command signal responsive to the road wheel force signal, the vehicle speed signal, and the feedback torque sensor signal. The method for steering a vehicle further includes generating a road wheel command signal responsive to the road wheel position signal, the vehicle speed signal, the feedback torque sensor signal, and the steering wheel position signal. The method for steering a vehicle further includes generating a force compensated position command signal in a road wheel unit responsive to the road wheel force signal and/or generating a position compensated torque command signal in a steering wheel unit responsive to the steering wheel position signal.

A storage medium encoded with a machine readable computer program code including instructions for causing a computer to implement the method for steering a vehicle with a steer-by-wire system disclosed above.

A computer data signal comprising instructions for causing a computer to implement a method for steering a vehicle with a steer-by-wire system disclosed above.

Also disclosed herein is a position control system responsive to load comprising: a position control unit responsive to a position command signal for controlling position, the position control unit includes a position sensor to produce and transmit a position signal and a sensor to produce and transmit a force signal. Wherein the position control unit comprises a closed loop control system responsive to the position command signal, a position signal from the position sensor, and the force signal.

Also disclosed herein is a torque control system responsive to position comprising: a torque control unit responsive to a torque command signal for controlling torque, the torque control unit includes a position sensor to produce and transmit a position signal and a torque sensor to produce and transmit a torque sensor signal. Wherein the torque control unit comprises a control system responsive to the torque command signal, the torque sensor signal, and the position signal Further disclosure herein includes a method for controlling position with a position control system responsive to load, the method comprising: receiving a force signal, a position signal from a position sensor, and a position command signal, and generating a force compensated position command signal in a position control unit responsive to the position command signal the force signal and the position signal. Wherein the force compensated position command signal, the position signal, and the force signal are employed in a position control unit forming a closed loop control system.

Further disclosure herein includes a method for controlling torque with a torque control system responsive to position, the method comprising: receiving a position signal from a position sensor, a torque sensor signal, and receiving a torque command signal, and generating a position compensated torque command signal in a torque control unit responsive to the torque command signal, the torque sensor signal, and the position signal. Wherein the position compensated torque command signal the position signal, and the torque signal are employed in a torque control unit; and the position compensated torque command signal, the position signal, and the torque signal are employed in a torque control unit forming a closed loop control system.

A storage medium encoded with a machine readable computer program code including instructions for causing a computer to implement a method for controlling position with a position control system responsive to load.

A storage medium encoded with a machine readable computer program code including instructions for causing a computer to implement a method for controlling torque with a torque control system responsive to position.

A computer data signal, said computer data signal comprising instructions for causing a computer to implement a method for controlling position with a position control system responsive to load.

A computer data signal, said computer data signal comprising instructions for causing a computer to implement a method for controlling torque with a torque control system responsive to position.

BRIEF DESCRIPTION OF THE DRAWINGS

The present invention will now be described, by way of an example, with references to the accompanying drawings, wherein like elements are numbered alike in the several figures in which:

FIG. 15 is a Bode plot depicting an input impedance frequency response for various input signals;

FIG. 22 is a Bode plot depicting an input impedance frequency response with the bandwidth of the position control system/loop reduced.

DETAILED DESCRIPTION OF THE INVENTION

Figure 1:
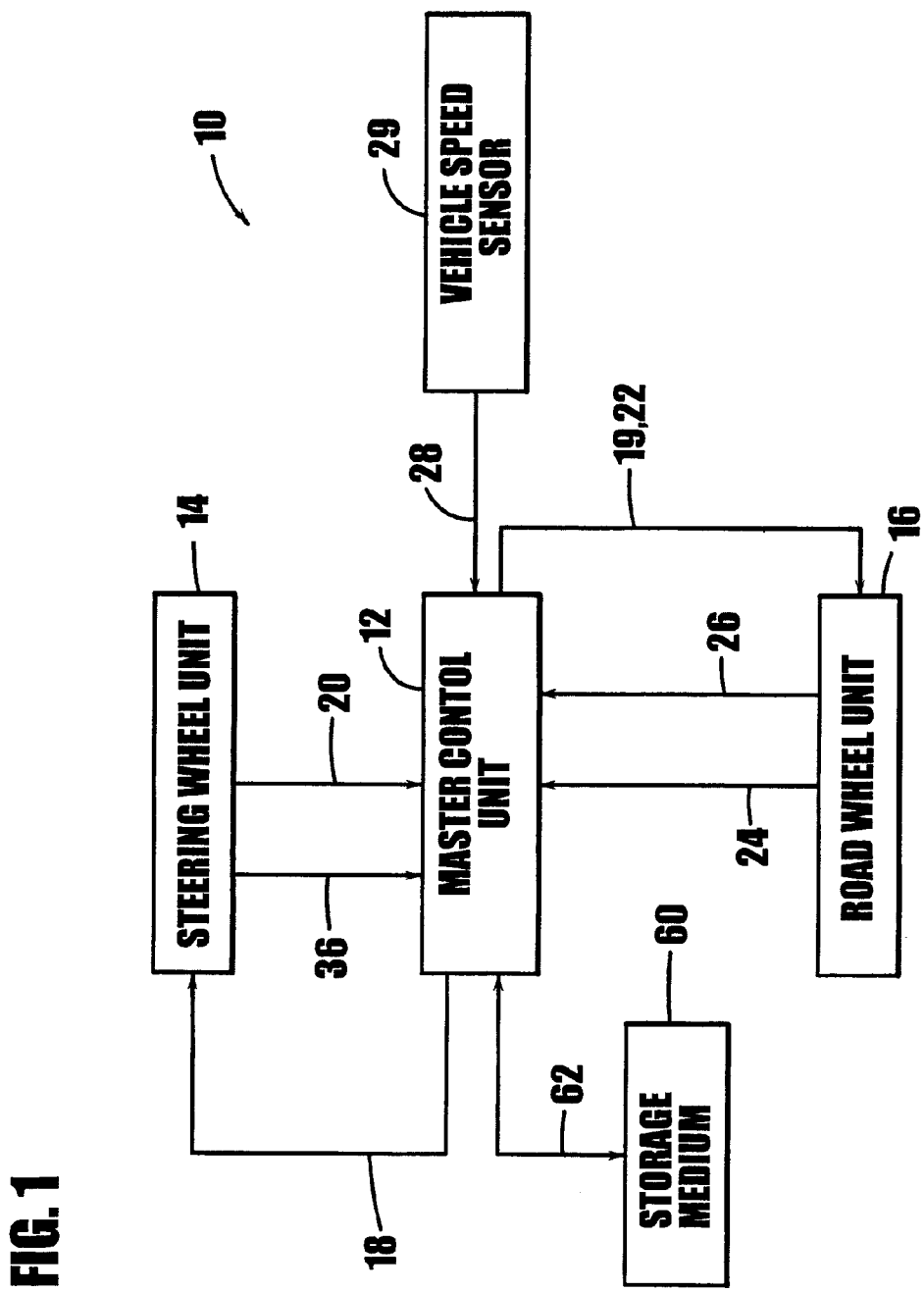
FIG. 1 is a block diagram illustrating a steering control system in one embodiment of the present invention.

Referring to FIG. 1, there is shown an automobile steering control system. The steer-by-wire control system 10 comprises several closed loop subsystems that work together to provide an operator with control over the direction of the vehicle and to provide the operator with desirable tactile feedback in response to operator commands and system conditions. Exemplary steer-by-wire control systems, such as are described in detail in commonly assigned U.S. Pat. No. 6,363,305, entitled STEER-BY-WIRE SYSTEM, filed Sep. 18, 2000, and commonly assigned U.S. Pat. No. 6,370,460, entitled STEER-BY-WIRE SYSTEM, filed Dec. 28, 2000, the disclosures of which are incorporated by reference herein in their entirety.

The present invention may be utilized in various types of vehicles employing electronic steering or steer-by-wire systems. A preferred embodiment of the invention, by way of illustration is described herein as it may be applied to an automobile employing a steer-by-wire system. While a preferred embodiment is shown and described by illustration and reference to an automobile steering system, it will be appreciated by those skilled in the art that the invention is not limited to the automobiles alone, and may be applied to all vehicles employing electronic steering systems or steer-by-wire systems including rear or four wheel steering systems. Moreover, it will be appreciated that the control system and methodology disclosed herein is not limited to steering systems alone but is in fact, applicable to control systems and control loop architecture in general.

Disclosed herein by way of an exemplary embodiment is a position control that can adapt to the varying load and thus improving performance. Performance is improved in the areas of system tracking, disturbance rejection and stability. In an exemplary embodiment, an enhancement to conventional control laws for position (motion) control of systems (servos, actuators etc) using an enhanced scheme is disclosed. The enhanced scheme operates by including a measurement of load (force) acting on the system as a feedback signal. In an automotive steering application, this would be moment about the tire (or king pin), forces acting on the steering rack, tie rod force, their estimates or equivalents and the like, as well as combinations including at least one of the foregoing. The feedback term effectively negates the variance in the system dynamics due to operating conditions. This allows a conventional control to then be implemented with optimal performance for all conditions.

Another embodiment of the invention described herein addresses the abovementioned issues of tactile feedback and stability by using information about steering wheel position to directly influence the torque felt by the driver. Steering wheel position may include an actual measure of the position of a steering wheel, motor position, even road wheel position, their estimates or equivalents, and the like, as well as combinations including at least one of the foregoing. By using a properly shaped transfer function, the input impedance of the steering system can be manipulated over a wide range of operating characteristics to obtain the desired feel. Including steering wheel position in determination of the torque felt by the driver provides the desirable coupling between steering wheel position and steering wheel torque. However, beyond the fixed coupling that a mechanical connection provides, this approach provides a tunable coupling that can be adjusted based upon operator preferences, system characteristics, or operating conditions to achieve the desired steering feel for the vehicle overall. The disclosed embodiment is an approach, which allows a level of tunability not currently available in existing steer-by-wire systems. Moreover, absent the features of the disclosed embodiment, it may not be possible to get the desired steering feel from a steer-by-wire system. Alternatively, this approach may allow cost reduction in the steer-by-wire system by providing acceptable performance while using lower bandwidth actuators.

The issue of "free control" for steer-by-wire systems has been addressed in some instances by adding a friction device to the steering wheel actuator. Additional friction has helped to address the issue and reduce free control oscillations, but often results in a system with reduced or poor steering feel. Adding friction tends to mask the problem rather than addresses the fundamental issue. By comparison, the embodiments disclosed herein help address free control and meanwhile includes the ability to tune the feel of the steering system.

Referring once again to FIG. 1, a steering wheel unit 14 detects the position and movement of a steering wheel or any equivalent operator input device(not shown) and sends a steering wheel position signal 20 to the master control unit 12. The master control unit 12 combines the information of the steering wheel position 20, a feedback torque sensor signal 36, with a vehicle speed signal 28 from a vehicle speed sensor 29 and tie-rod force signals 24, 26 from a road wheel unit 16. Using these input signals, the master control unit 12 produces road wheel command signals 19, 22 (one for a left and right road wheel respectively) that are sent to the road wheel unit 16. In addition, a steering wheel torque command signal 18 is sent to the steering wheel unit 14.

It will be appreciated, that the steering wheel unit 14, master control unit 12, and road wheel unit 16 are described for illustrative purposes. The processing performed throughout the system may be distributed in a variety of manners. For example, distributing the processing performed in the master control unit 12 among the other processes employed may eliminate the need for such a component or process as described. Each of the major systems may have additional functionality that will be described in more detail herein as well as include functionality and processing ancillary to the disclosed embodiments. As used herein, signal connections may physically take any form capable of transferring a signal, including electrical, optical, or radio.

Figure 2:
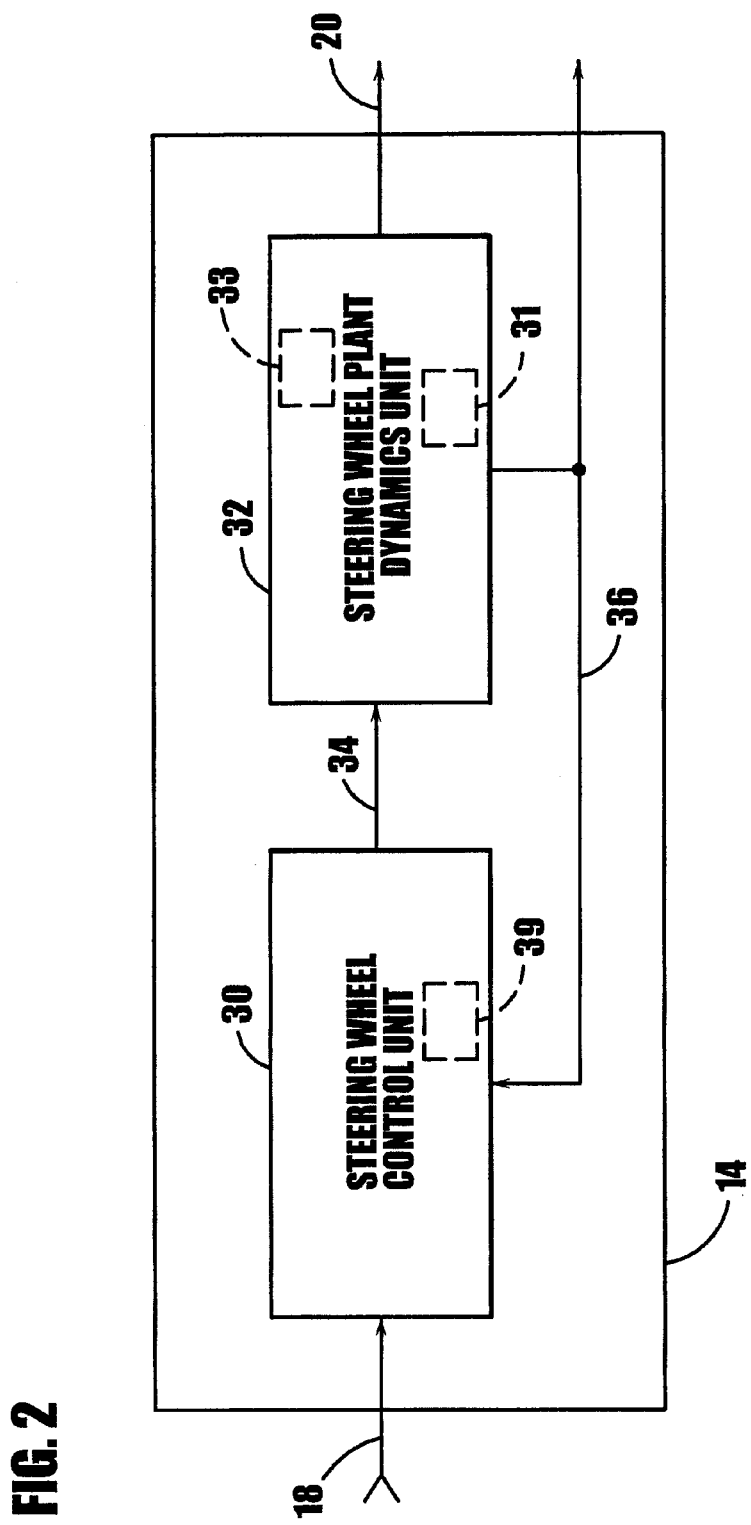
FIG. 2 is a block diagram of a steering wheel unit as shown in FIG. 1.

Referring to FIG. 2, the steering wheel unit 14 is a control system (in this instance closed loop, but not necessarily so) that uses steering wheel torque as the feedback signal. The steering wheel torque command signal 18 is received from the master control unit 12 (FIG. 1) into the steering wheel control unit 30 where the signal is compared to the feedback torque signal 36. For example, a simple method of comparison is simply to subtract one signal from another. A zero result indicates that the desired torque is being applied. Generally, the steering wheel unit 14 will include a torque sensor, and a position sensor. A frequency-based compensator 39 is employed in the steering wheel control unit 30 to maintain stability of the steering wheel plant dynamics unit 32. The frequency-based compensator 39 is used to provide stability of the steering wheel control system at sufficient gains to achieve bandwidth greater than 3 Hz. In the case, of each local loop (hand wheel and road wheel systems) the bandwidth of each affects the stability of the overall system. If either road wheel or hand wheel have low bandwidth, over all stability is reduced and compensation on a higher level is required. A torque command signal 34 is then passed to the plant dynamics unit 32 as needed to comply with the steering wheel torque command signal 18. The steering wheel plant dynamics unit 32 contains the necessary elements to provide a reaction torque to the operator as well as a torque sensor 31 to provide the feedback torque signal 36 to the control unit 30 as well to the master control unit 12 (FIG. 1), and a steering wheel position sensor 33 that produces and sends a steering wheel position signal 20. Generally, reaction torque will be imparted to the operator by an electric motor coupled either to the steering column or to the rack. Preferred reaction torque motors are those with reduced torque ripple, such as are described in detail in commonly assigned U.S. patent application Ser. No. 09/656,116, Attorney Docket No. H-200000, entitled TORQUE RIPPLE FREE ELECTRIC POWER STEERING, filed Sep. 6, 2000, the disclosures of which are incorporated by reference herein in their entirety. It is noteworthy to appreciate that a torque ripple free motor is desirable, but not required for this invention. Either type will work with the invention as disclosed and described.

Figure 3:
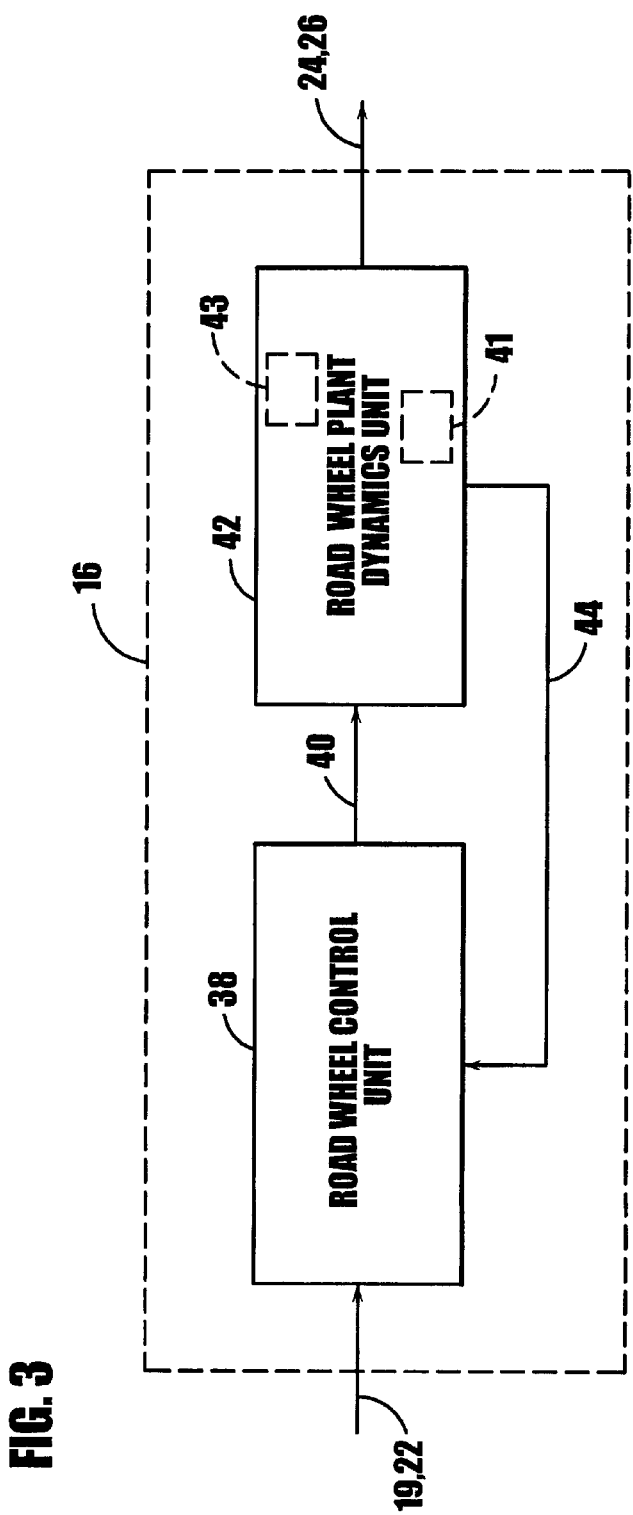
FIG. 3 is a block diagram of a road wheel unit as shown in FIG. 1.

It will further be appreciated that while particular sensors and nomenclature are enumerated to describe an exemplary embodiment, such sensors are described for illustration only and are not limiting. Numerous variations, substitutes, and equivalents will be apparent to those contemplating the disclosure herein. For example, while a torque sensor 31 and steering wheel position sensor 33 are described to sense the feedback torque signal 36 and steering wheel position signal 20, such description is illustrative. Any sensor and nomenclature which can be utilized to measure equivalent or similar parameters is also contemplated Referring to FIG. 3, the road wheel unit 16, like the steering wheel unit, is also a control system (once again, closed loop in this instance, but not necessarily) that uses road wheel position as a feedback signal. There may be a road wheel unit for each steerable wheel or one shared for both wheels. (only one is shown in the drawing) In an embodiment, within the road wheel unit 16, the road wheel command signal (19 for the left wheel, 22 for the right) is received from the master control unit 12 and compared with a road wheel position signal 44 within the road wheel control unit 38. A position command signal 40 is sent to the road wheel plant dynamics unit 42. The road wheel plant dynamics unit 42 contains the necessary elements to control the position of the vehicle wheels as well as a road wheel position sensor 41 to provide road wheel position signal 44 indicative of the road wheel position. It will be appreciated that the road wheel command could be dependent upon additional sensors and functions. The road wheel system includes drive motors, which may be operated in either current or voltage mode, provided, in each case, sufficient stability margins are designed into the road wheel system 16 with local loop (road wheel system loop) frequency based compensators. In an embodiment, a bandwidth greater than 3 Hz has been shown to be desirable in either case. In addition, there may also be a desire to command each road wheel unit 16 with a different command as required to obtain desired performance. For example, the commands may differ when cornering a vehicle to enhance individual road wheel tracking of the desired radius. A road wheel force sensor 43 is also located within plant dynamics unit 42. The road wheel force sensor 43 detects and also measures the forces/loads exerted in the road wheel system 16 and sends a signal representative of the measured forces to the master control unit 12 (FIG. 1). In an exemplary embodiment, a left, and a right road wheel force sensor 43*a,* 43*b* (FIG. 4) measure road wheel forces and transmit signals (24 for one wheel, 26 for the other) representative of the left and right road wheel road wheel forces respectively.

Similarly once again, it will further be appreciated that while particular sensors are enumerated to describe an exemplary embodiment, such sensors and nomenclature are described for illustration only and are not limiting. Numerous variations, substitutes, and equivalents will be apparent to those contemplating the disclosure herein. For example, while a road wheel force sensor 43*a,* 43*b* and road wheel position sensor 41 are described to sense the road wheel force signals 24, 26 and road wheel position signal 44, such description is illustrative. Any sensor and nomenclature which can be utilized to measure equivalent or similar parameters is also contemplated.

Figure 4:
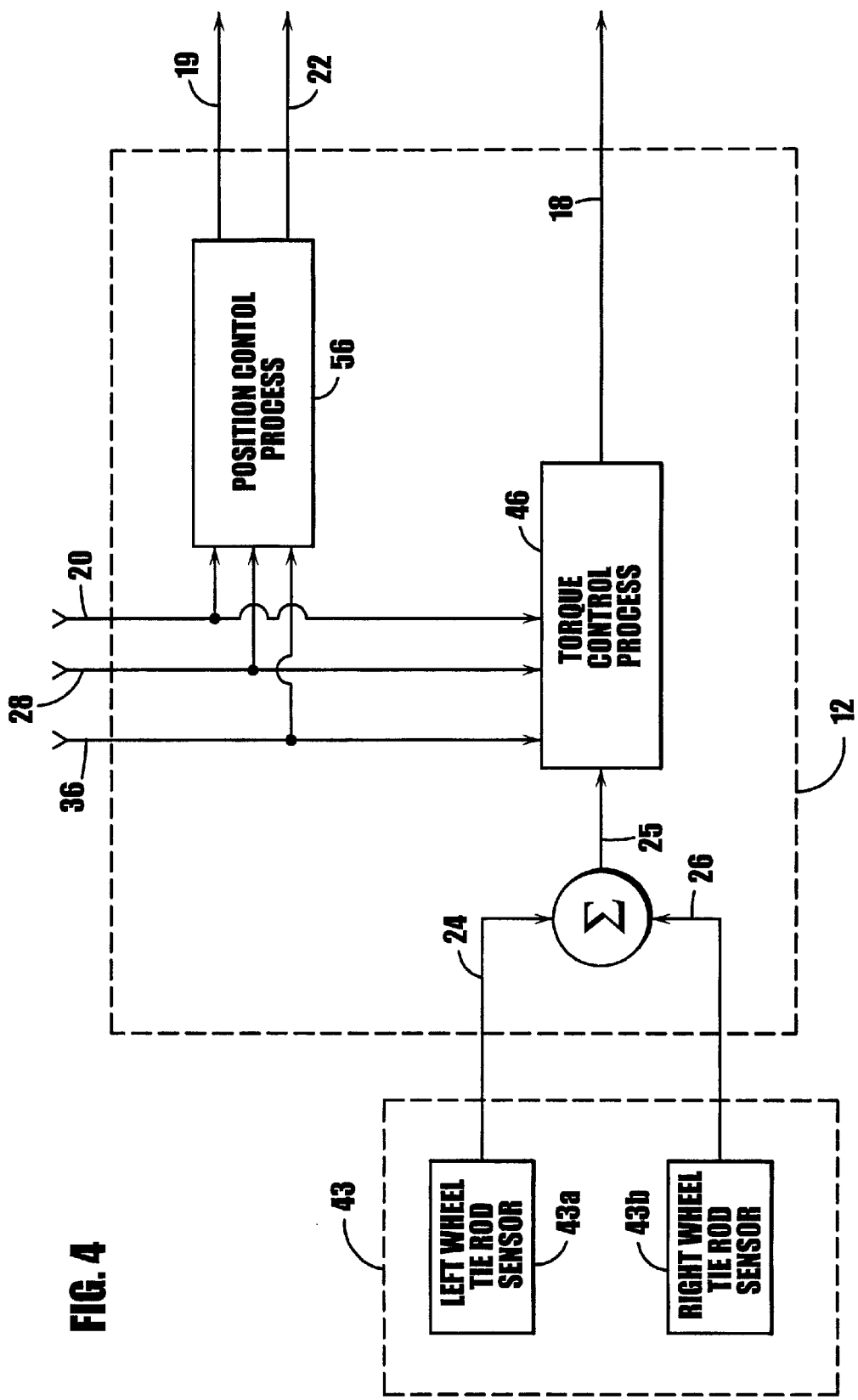
FIG. 4 is a block diagram of a master control unit as shown in FIG. 1.
Figure 11:
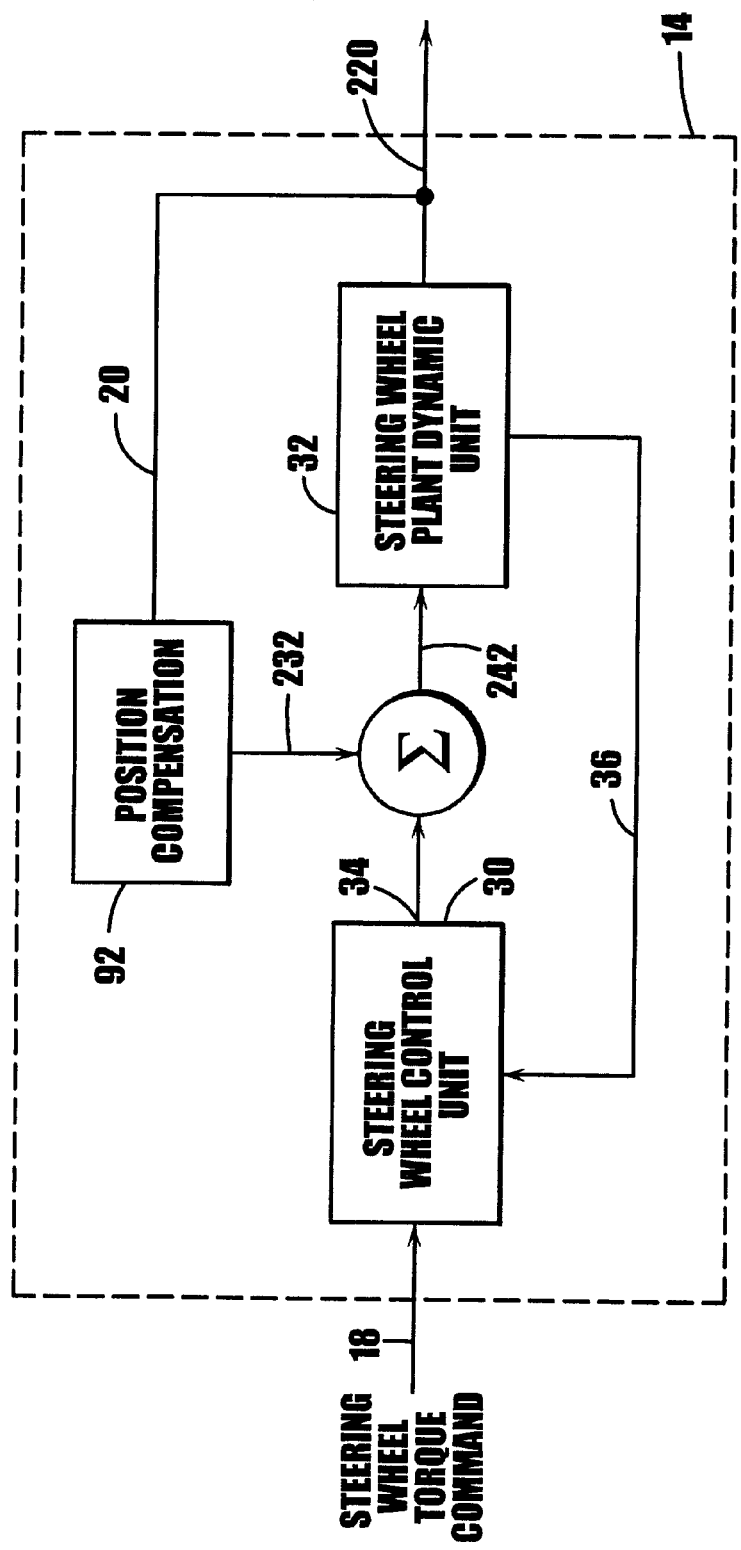
FIG. 11 depicts a simplified block diagram of an exemplary embodiment of a torque control implementation.

FIG. 4 shows a more detailed view of the master control unit 12. The master control unit 12 receives the steering wheel position signal 20 and torque sensor signal 36 from the steering wheel unit 14. This steering wheel position signal 20, feedback torque sensor signal 36 and vehicle speed signal 28 are utilized to generate and output the road wheel position command signals 19, 22 within the position control process 56 of the master control unit 12. Moreover, the steering wheel position signal 20, road wheel force signal(s) 24, (26), feedback torque sensor signal 36 and vehicle speed signal 28 are utilized to generate and output the steering wheel torque command signal 18 within the torque control process 46 of the master control unit 12. The torque control process 46 and position control process 56 forming outer loop controls for the steering wheel unit and road wheel unit respectively. The master control unit 12 as well as any controller functions may be distributed to the steering wheel unit 14 and road wheel unit 16. The master control unit 12 is disposed in communication with the various systems and sensors of the steer-by-wire system 10. Master control unit 12 (as well as the steering wheel control unit 30 and road wheel control unit 38 receives signals from system sensors, quantify the received information, and provides an output command signal(s) in response thereto, in this instance, for example, commands to the subsystems and to the hand wheel plant 32 and road wheel plant 42 respectively. As exemplified in the disclosed embodiments, and as depicted in FIGS. 5, 6, and 11, one such process may be determining from various system measurements, parameters, and states the appropriate force feedback for compensating a road wheel system 16, another may be determining from various system measurements, parameters, and states the appropriate position feedback for compensating a hand wheel system 14.

In order to perform the prescribed functions and desired processing, as well as the computations therefore (e.g., the control algorithm(s), and the like), the controllers may include, but not be limited to, a processor(s), computer(s), memory, storage, register(s), timing, interrupt(s), communication interface(s), and input/output signal interfaces, and the like, as well as combinations comprising at least one of the foregoing. For example, master control unit 12 may include signal input signal filtering to enable accurate sampling and conversion or acquisitions of such signals from communications interfaces. Additional features of master control unit 12, the steering wheel control unit 30, and road wheel control unit 38 and certain processes therein are thoroughly discussed at a later point herein.

Position Control For Systems Under Load: Force Feedback In Position Control

Figure 5:
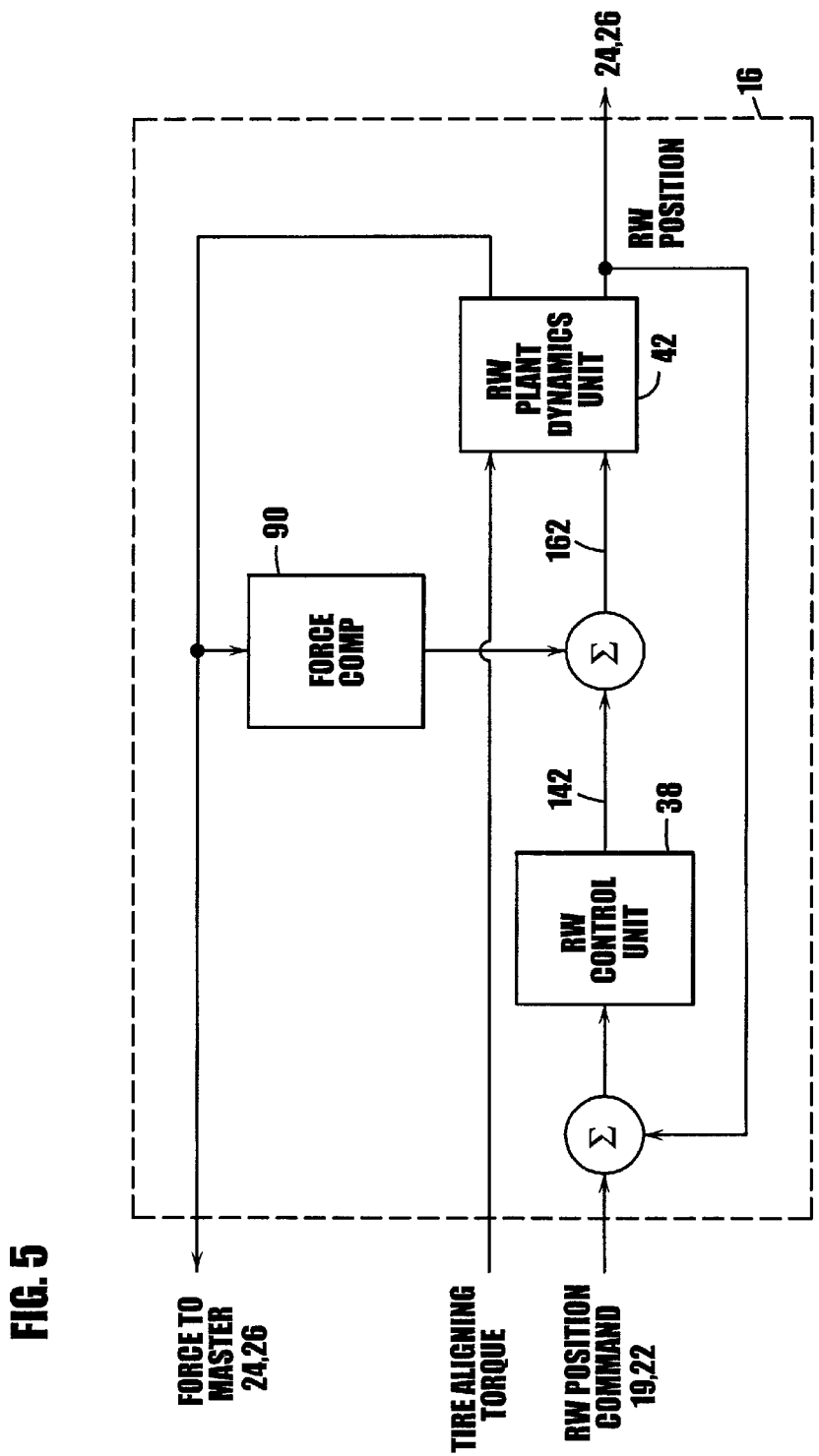
FIG. 5 depicts a simplified block diagram of an exemplary embodiment of a position control implementation.
Figure 6:
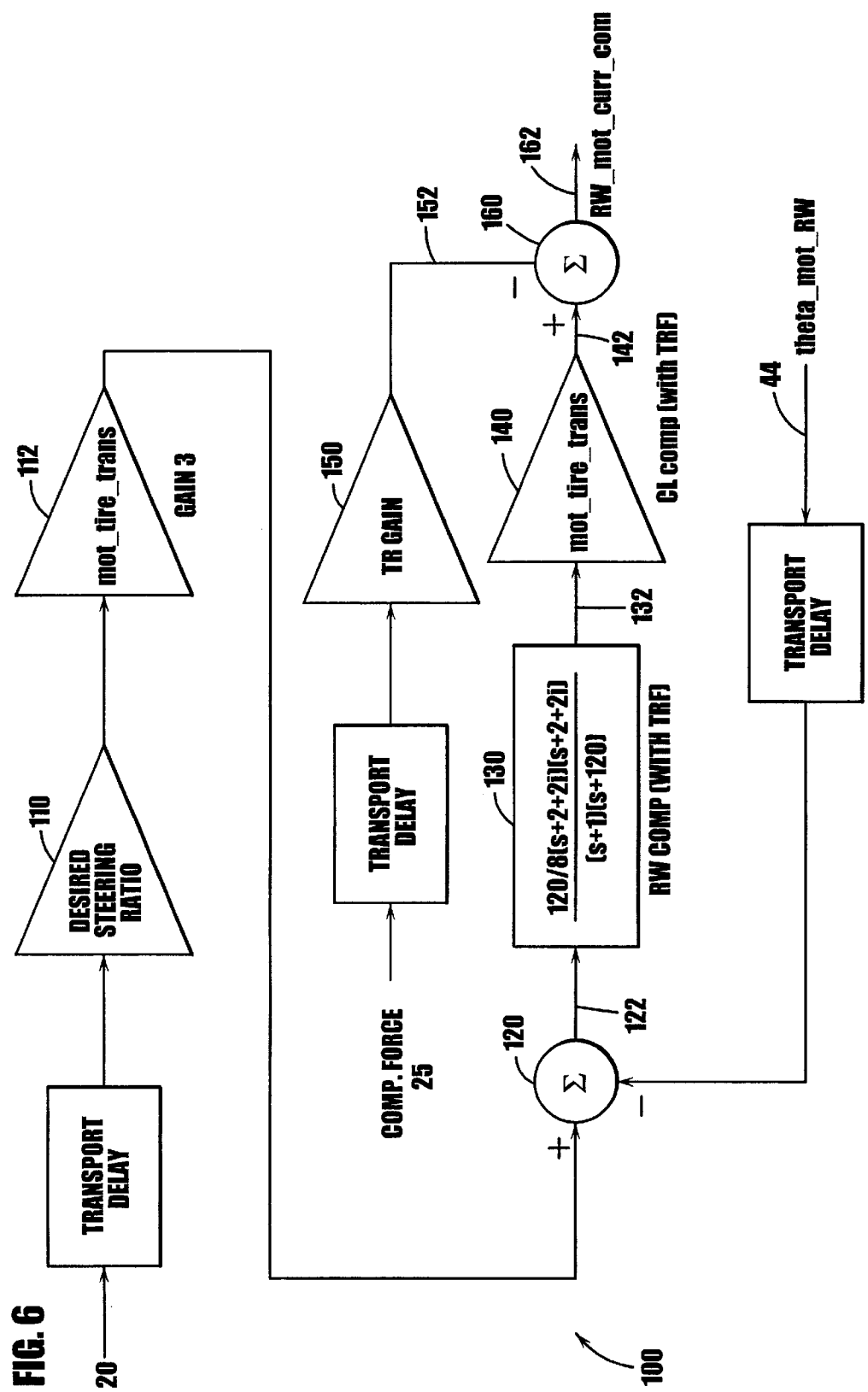
FIG. 6 depicts an enhanced control process of an exemplary embodiment of a position control implementation.

Referring now to FIG. 5 depicting a simplified block diagram of a road wheel unit 16 in an exemplary embodiment of the position control implementation. In this case the existing control functions implemented by the road wheel control unit 38 (as discussed earlier as part of the road wheel control unit 38) is used to control the road wheel position of the system 10 via the road wheel plant dynamics unit 42, (also discussed earlier). The position control functionality is augmented by the enhanced component denoted Force Comp 90, which is based on the load experienced by the plant, in the example herein, the road wheel plant dynamics unit 42.

As discussed above, the road wheel plant dynamics unit 42 (FIG. 3) includes tie-rod sensors 43a and 43b generating tie-rod force signals 24 and 26. These signals are sent to the master control unit 12 for processing. The road wheel force signals may be combined to formulate a composite force signal 25 to facilitate processing. It is noteworthy to appreciate that each of the road wheel force signals 24 and 26 should be associated with an appropriate sign, namely to emulate or identify the force that would be observed if both tie rods were connected, as in a conventional rack based steering system. For example, in a turn one wheel turns inward toward the vehicle while the other turns outward away from the vehicle. In this state, the forces are opposite on each tie rod, one in compression and the other in tension. So, to properly sense the composite tie rod force correctly the sum the magnitude of each and provide proper sign information corresponding to the direction of the turn. Likewise, the same operation may be accomplished by subtraction of each road wheel force signal 24, and 26 from one another employing an opposite sign sense (compression positive, tension negative).

FIG. 6 depicts a simplified diagram of an algorithm that implements the disclosed force compensation for road wheel position control. More specifically, FIG. 6 depicts the enhanced control process 100 for the road wheel control unit 38 including force feedback. The road wheel control unit 38 performs several processes for generating the road wheel position command 40. These processes utilize as inputs; road wheel force 24, 26 or the composite road wheel force signal 25, the steering wheel (or hand wheel) position signal 20 to generate the road command signal 18 as an output. The enhanced control process 100 uses the road wheel position 44, road wheel force 24, 26 and the steering wheel position signal 20, to generate a desired command signal. In FIG. 6, the steering wheel position signal 20 is scaled by a selected ratio at gains 110 and 112 to formulate a desired road wheel position. The desired road wheel position is the compared with the actual road wheel position 44 also depicted as the motor position theta__mot RW at summer 120 to generate a position error 122. The position error 122 is applied to a frequency-based compensation 130 to formulate a compensated position command 132 and then scaled at gain 140 to formulate a position command signal 142. It is noteworthy to appreciate that this position command signal 142 is analogous to the position command signal 40 discussed above with existing implementations of the road wheel control unit 38. The road wheel forces, 24, 26 or more particularly in this instance, a composite thereof denoted composite road wheel force 25 is scheduled or scaled at gain 150 to formulate a force compensation signal 152 and combined with the position command signal 142 at summer 160 to formulate a force compensated position command signal 40' thereafter applied to the road wheel plant dynamics unit 42.

The compensation process 130 includes, but is not limited to, frequency based filtering to manipulate the spectral content of the compensated position command signal 132 to ensure road wheel system 16, loop stability. The combination of the position command signal 142 and the feedback force (force compensation signal 152) operate in conjunction to modify the spectral content of sensed road feedback to the vehicle operator and ensure road wheel system 16, loop stability. It should also be noted that FIG. 6 depicts additional elements, connections, interconnections and the like. It will be appreciated that such configurations are commonly employed for implementation of a selected control configuration. For example, transport delays may be employed to ensure that date time coherency is addressed. Likewise, scaling may be employed to address unit conversions and the like.

It will be appreciated that while the disclosed embodiments refer to a configuration utilizing scaling in implementation, various alternatives will be apparent. It is well known that such gain amplifiers depicted may be implemented employing numerous variations, configurations, and topologies for flexibility. For example, the processes described above could employ in addition to or in lieu of scaling gains, look-up tables, direct algorithms, parameter scheduling or various other methodologies, which may facilitate execution of the desired functions, and the like, as well as combinations including at least one of the foregoing. In a similar manner, it will be appreciated that the frequency based compensation 130 may be implemented employing a variety of methods including but not limited to passive, active, discrete, digital, and the like, as well as combinations including at least one of the foregoing. Moreover, the frequency-based compensation 130 as disclosed is illustrative of an exemplary embodiment and is not limiting as to the scope of what may be employed. It should also be noted, that in an exemplary embodiment simple scaling of a gain 150 is employed in the force path. It should be evident that similar frequency based compensation could also be employed as part of the force feedback as desired to tailor the spectral content of the force compensation signal 152 employed as compensation.

It is important to note that all the examples provided herein relate to a vehicle having two steerable wheels for illustrative purposes. However, this type of system could be easily extended to a vehicle that requires one or more wheels to be steered simultaneously by adding additional road wheel units 16.

Figure 7:
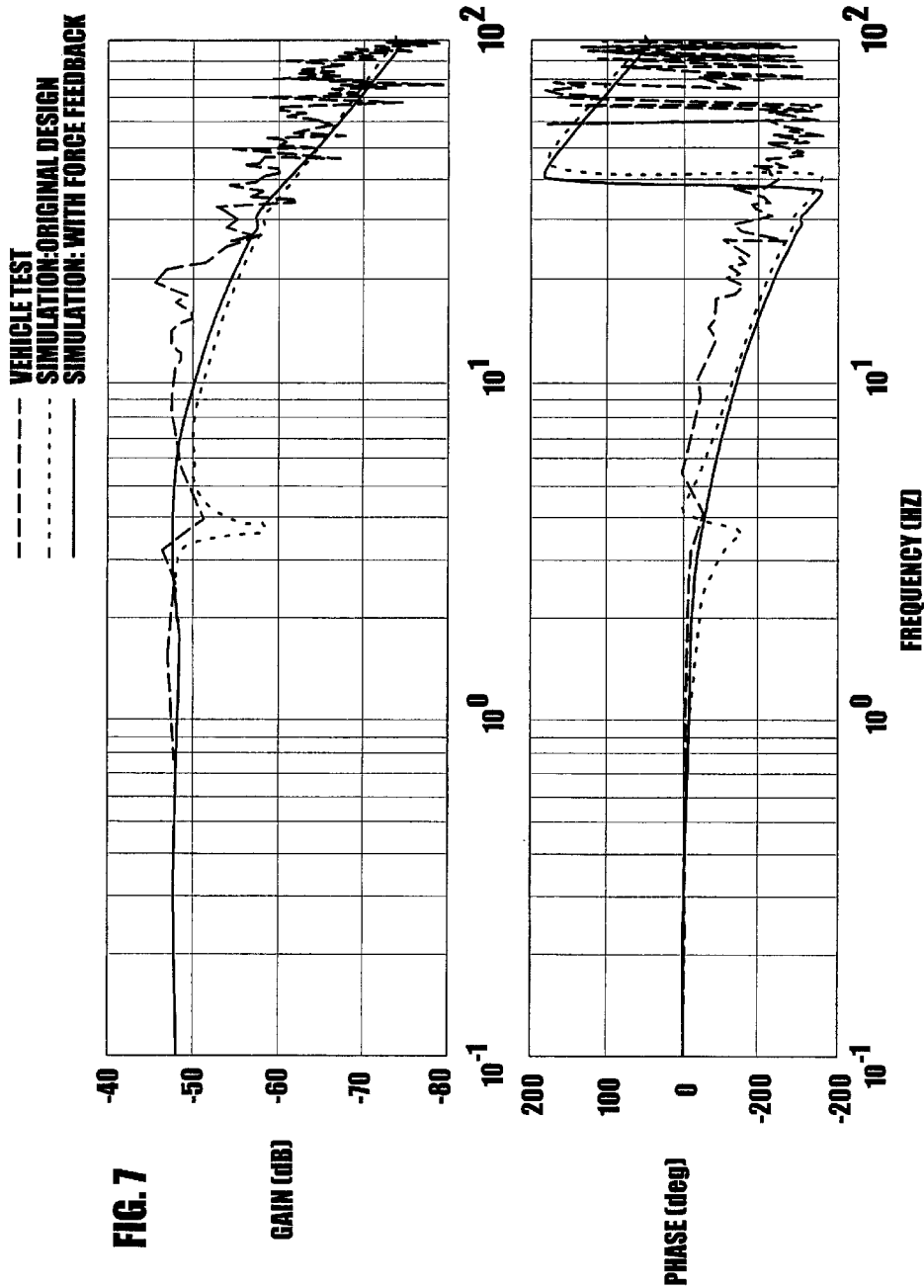
FIG. 7 depicts a Bode plot with disturbance rejection responses of an existing position control system and an exemplary embodiment including force feedback.

The benefits and enhancements achieved via an exemplary embodiment are made evident by observation of the Bode plots of road feedback (road disturbance rejection) depicted in FIG. 7. The figure depicts responses for a desired target vehicle and two simulations; the original position control; and the exemplary embodiment including force feedback compensation. An undesired mode (described below already as a loss of feedback) is evident at approximately 3 Hz for conventional control. With the enhanced control process 100 of the exemplary embodiment, employing force feedback, the undesired mode, which would have resulted in a reduction or loss of feedback to the operator, is eliminated.

Figure 8:
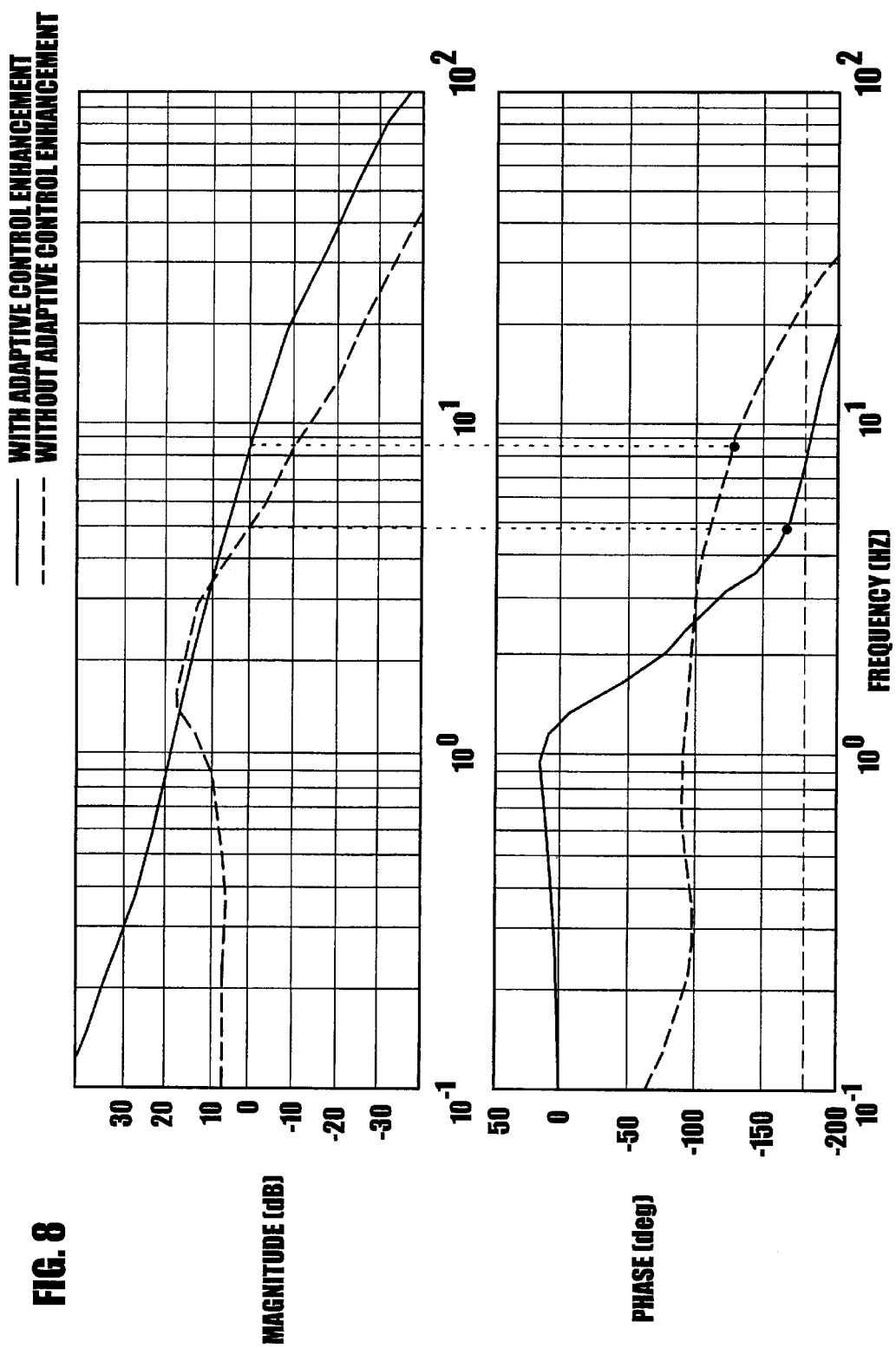
FIG. 8 depicts a Bode plot with a frequency response of the open loop system showing the stability effect of an exemplary embodiment of enhanced control.

Another benefit is that the enhanced control process 100 has a stabilizing effect on the road wheel system 14. An example of this effect is shown by the Bode plot in FIG. 8. Depicted in the figure is a frequency response of the open loop system showing the stabilizing effect of the enhanced control process 100 of the exemplary embodiment on the open loop road wheel system 14. The conventional control is not added to either case. An improvement can be seen in the phase margin, which is an indication of relative stability. This effect is beneficial in that the load (force) feedback exhibits a dampening effect on the system. The desired gain margin can then be achieved via a conventional control law. This allows the conventional control law to focus on providing enhanced performance under varying conditions.

Figure 9:
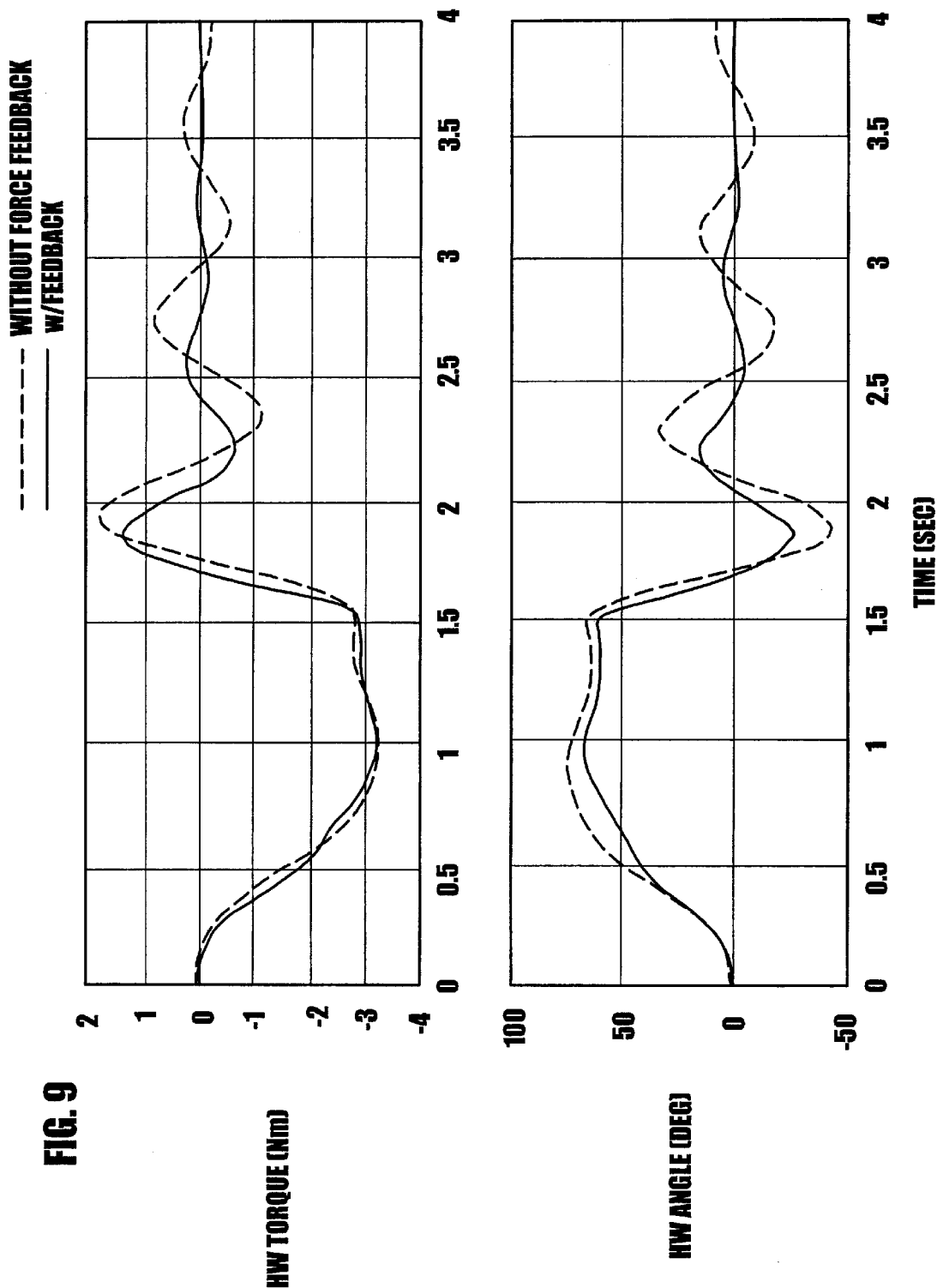
FIG. 9 depicts a time response of the system showing the stability effect of an exemplary embodiment of enhanced control on free control oscillation.

Yet, another way of looking at the stability enhancements to the road wheel system 14 is improvement in the free control oscillations. A more stable system would damp out such oscillations more rapidly than a less stable system. Such an improvement and increased damping is readily evident in FIG. 9 depicting a time history of free control oscillation. It is readily apparent from the figure, that the road wheel system 14 employing force feed back exhibits free control oscillations that are substantially eliminated within 2 cycles. Conversely, the system with out the force feedback as disclosed herein, exhibits significant oscillation even after four seconds.

Figure 19:
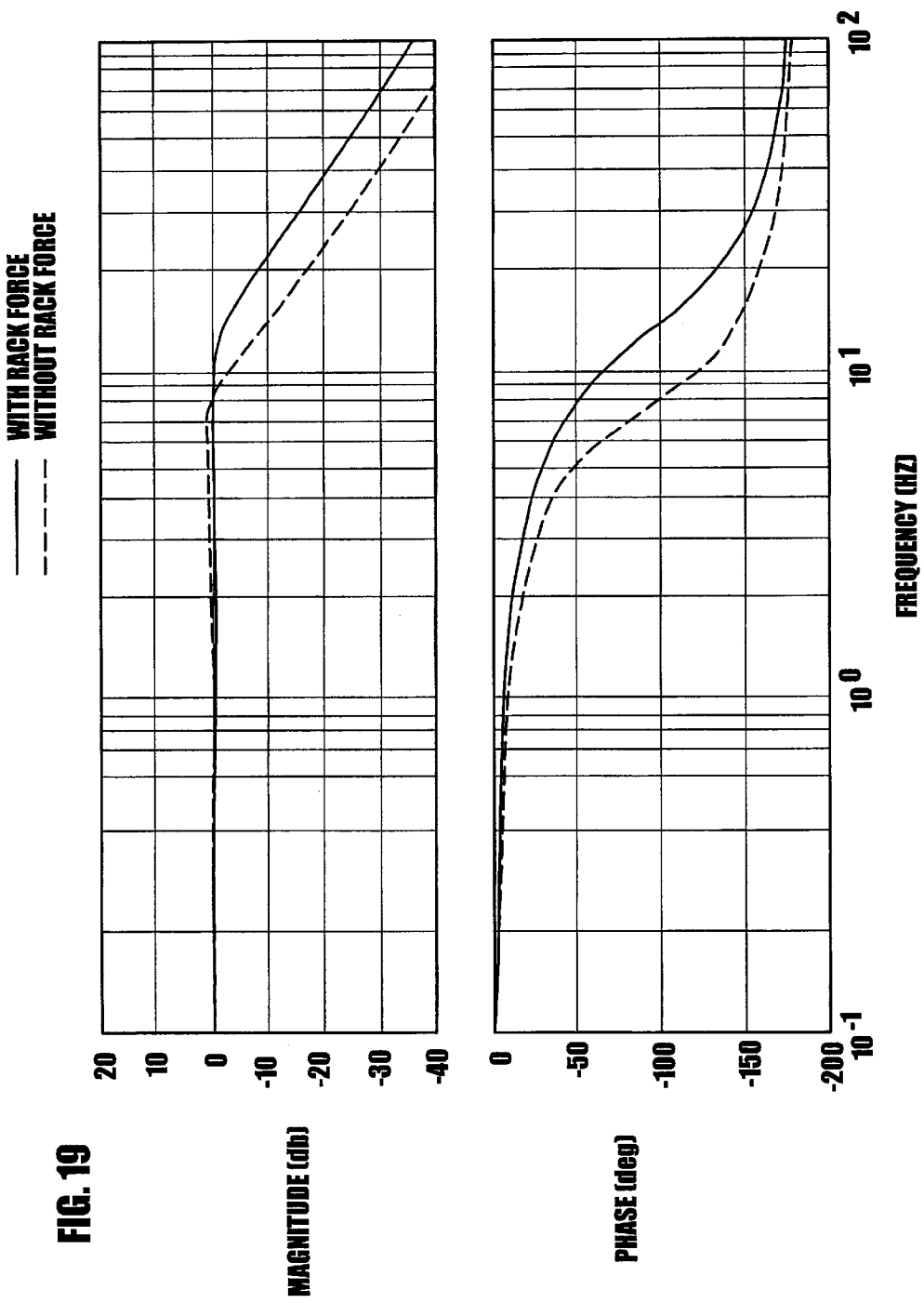
FIG. 19 depicts a Bode plot with a the closed loop frequency response of a position control system and an exemplary embodiment including force feedback for a moderate system load.
Figure 20:
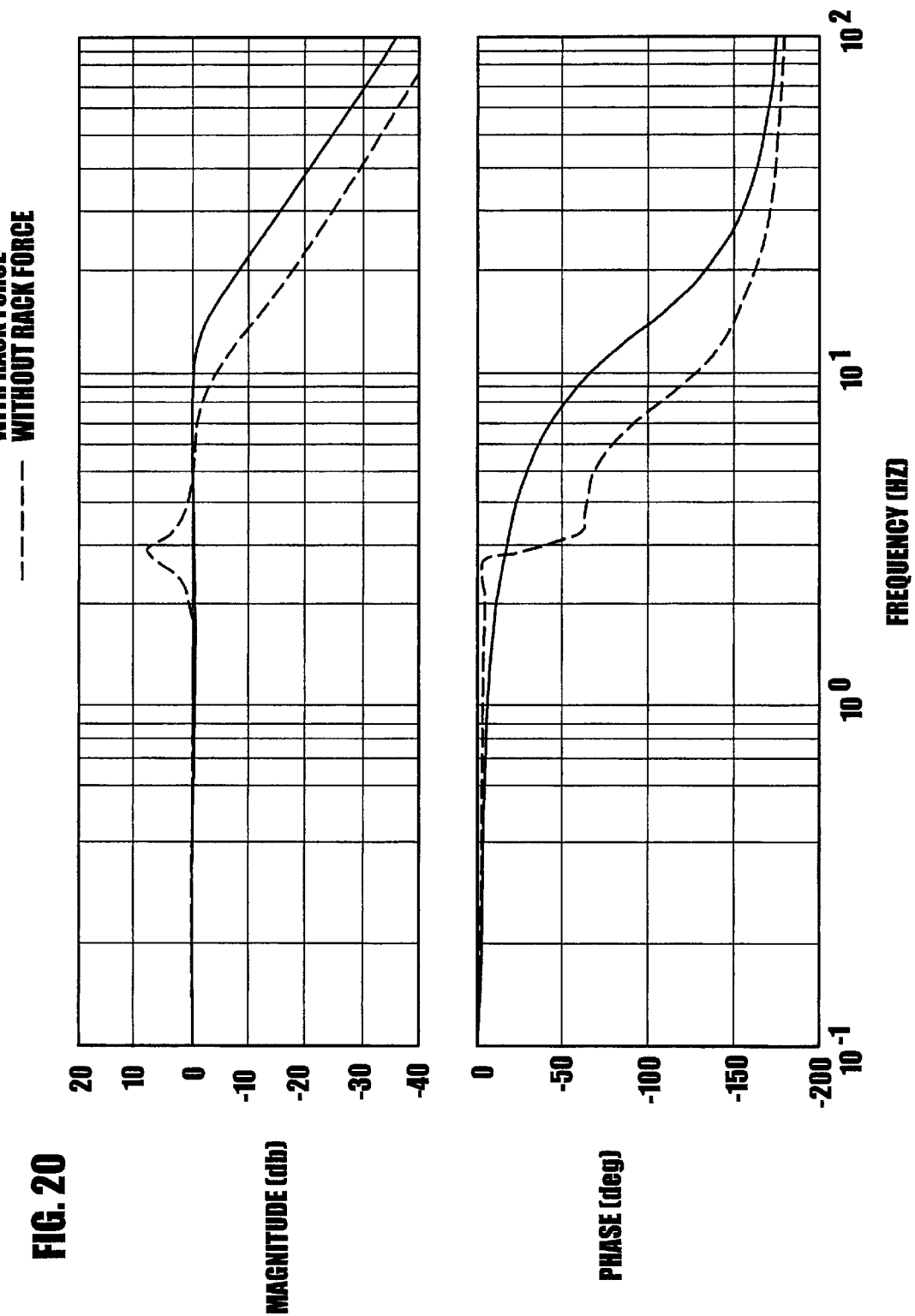
FIG. 20 depicts a Bode plot with a the closed loop frequency response of a position control system and an exemplary embodiment including force feedback for a lower system load.
Figure 21:
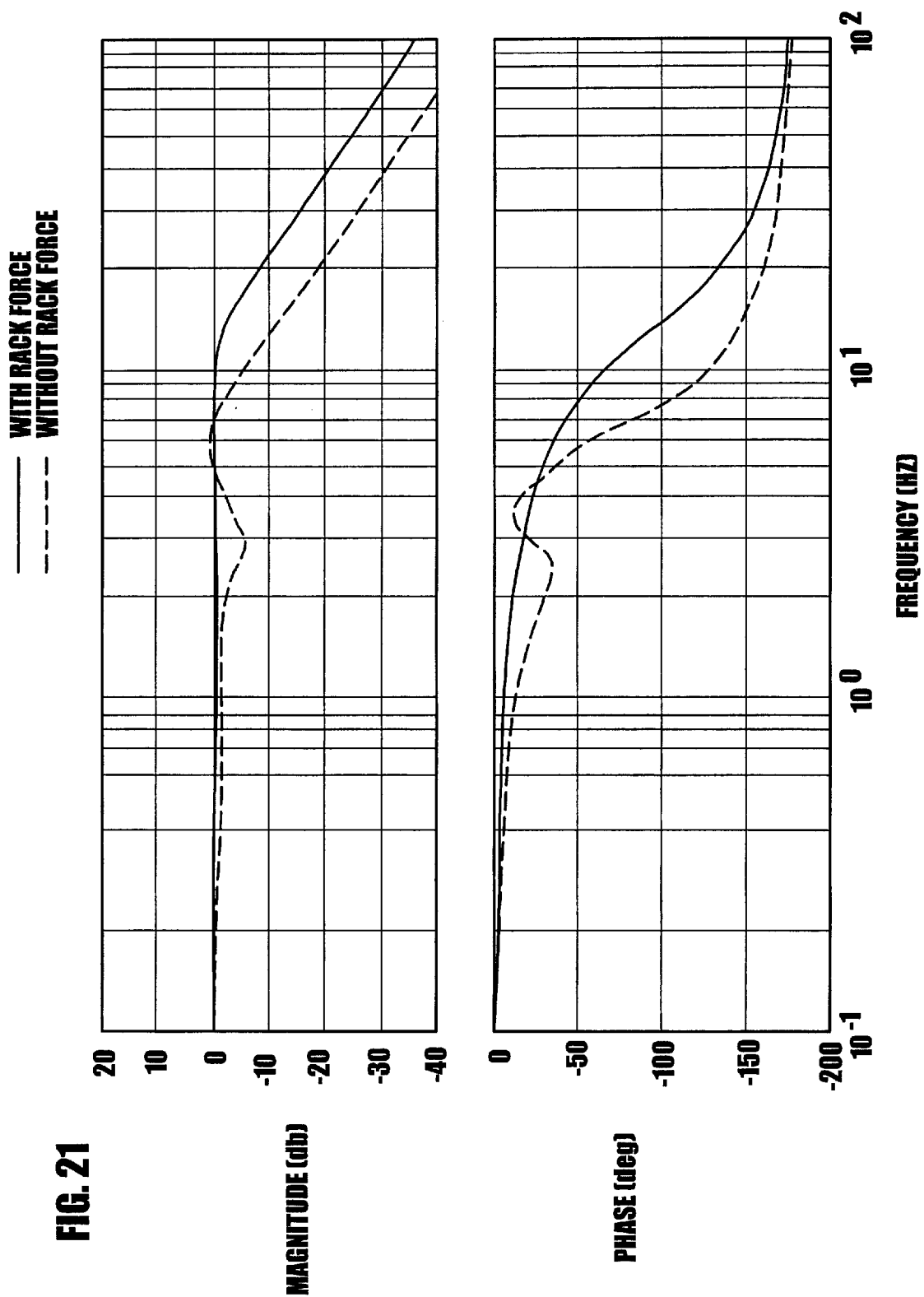
FIG. 21 depicts a Bode plot with a the closed loop frequency response of a position control system and an exemplary embodiment including force feedback for a higher system load.

Another benefit is that the enhanced control process 100 preserves the desired dynamic behavior of the closed loop road wheel system under varying loads. Examples of this effect are shown in FIGS. 19, 20, and 21. Depicted in these figures are frequency responses of the closed loop system showing the effect of the enhanced control process 100 of the exemplary embodiment on the closed loop road wheel system 14 as the system load is varied. In FIG. 19 a moderate tire load is applied and the conventional control is optimized for this load. Both embodiments have comparable performance in this case. In FIG. 20, the load is lowered (depicting highway-driving conditions) and a degradation in the performance of the conventional control is observed. However, there is no degradation in the performance the control system when the exemplary embodiment is employed. In FIG. 21, the load is raised (depicting static steering condition) and a degradation in the performance of the conventional control is once again, observed. However, here again, there is no degradation in the performance of the control system when the exemplary embodiment is employed. This effect is beneficial in that the load (force) feedback exhibits a robustness enhancement on the system.

Figure 10:
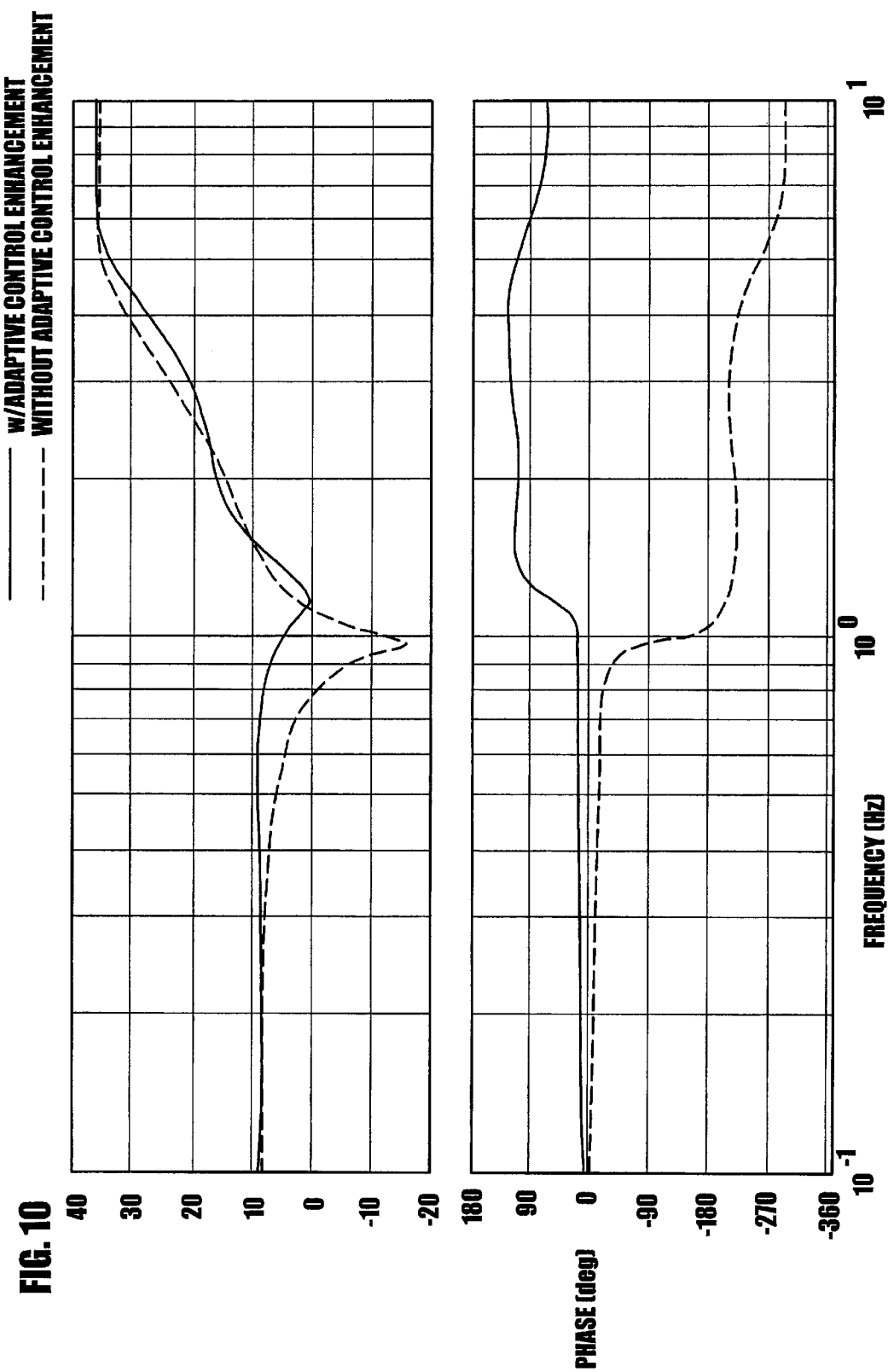
FIG. 10 depicts a Bode plot with a frequency response showing the effect of an exemplary embodiment of enhanced control on steering feel or system input impedance.

Another significant advantage realized by employing force feedback in a position control function for the road wheel system 14 is that it does not negatively impact the system bandwidth as significantly as a pure rate based damping might. It is well known, that rate based damping may be employed in a typical control loop to maintain stability. In an exemplary embodiment and as applied to a vehicle steering system as disclosed here, system bandwidth has a significant impact on the steering feel. A higher bandwidth position control system/loop exhibits an ability to closely follow operator/driver-applied input and as a result generate the expected effort (steering mechanism load) as feedback. Conversely, a system lacking sufficient bandwidth may lag behind an applied input, resulting in undesirable response or worse, instability. Input impedance is a way of characterizing or observing the feel of the steer-by-wire system 10. Turning to FIG. 10 it may be observed that the addition of the enhanced control process 100 and force feedback dramatically reduces the dip evident at 1 Hz and results in an appropriate phase response as well.

FIG. 22 shows the effect of reducing the bandwidth (from about ten Hertz to about one Hertz) of the position control system/loop on the overall input impedance. The reduced bandwidth results in sharper transitions in both gain and phase.

Compensation Using Position To Improve Feel and Stability:Position Feedback In Force Control Another embodiment of the invention described herein addresses the abovementioned issues of tactile feedback and stability by using information about steering wheel position to directly influence the torque felt by the driver. By using a properly shaped transfer function, the input impedance of the steering system can be manipulated over a wide range of operating characteristics to obtain the desired feel. Including steering wheel position in determination of the torque felt by the driver provides the desirable coupling between steering wheel position and steering wheel torque. However, beyond the fixed coupling that a mechanical connection provides, this approach provides a tunable coupling that can be adjusted based upon operator preferences, system characteristics, or operating conditions to achieve the desired steering feel for the vehicle overall.

Referring once again to FIG. 1, FIG. 2, as disclosed earlier, the steering wheel unit 14 is a closed loop control system that uses steering wheel torque as the feedback signal. A steering wheel torque command signal 18 responsive to the road wheel force is received from the master control unit 12 (FIG. 1) into the steering wheel control unit 30 where the signal is compared to the feedback torque signal 36. A frequency-based compensator 39 is employed in the steering wheel control unit 30 to maintain stability of the steering wheel plant dynamics unit 32.

Turning now to FIG. 11, as well, similar to the configuration and concepts described above in reference to FIG. 5, an additional compensation path is added to the steering wheel unit 14 to incorporate position feedback in the torque control loop (e.g., position feedback in a force control loop). FIG. 11 depicts a high-level block diagram of the steering wheel unit 14. It is noteworthy to appreciate that the diagram is similar to that depicted in FIG. 2, however, including, but not limited to, the addition of the steering wheel position signal 20 as feedback to the torque control functions provided by the steering wheel control unit 30. A position compensation process 92 compensates the steering wheel position feedback for combination with the compensated torque command signal 34 (e.g., the motor command in earlier implementations). A position compensated torque command signal 34 is then passed to the plant dynamics unit 32 as needed to comply with the steering wheel torque command signal 18. The steering wheel plant dynamics unit 32 contains the necessary elements to provide a reaction torque to the operator as well as a torque sensor 31 to provide the feedback torque signal 36 to the control unit 30 and the master control unit 12 (FIG. 1). The steering wheel plant dynamics unit 32, also includes a steering wheel position sensor 33 that produces and sends a steering wheel position signal 20. Generally, reaction torque will be imparted to the operator by an electric motor coupled either to the steering column or to the rack.

The disclosed embodiment involves feeding steering wheel position information directly into the steering wheel motor command through an appropriate transfer function. The steering wheel position signal 20 is applied to the steering wheel control unit 30 to provide the desired functionality. The position compensated steering wheel torque command 34 determines the steering wheel torque felt by the driver as generated by the steering wheel plant dynamics unit 32. This results in a direct relationship between steering wheel position and steering wheel torque, which can be tuned to get the desired steering feel to the operator.

Figure 12:
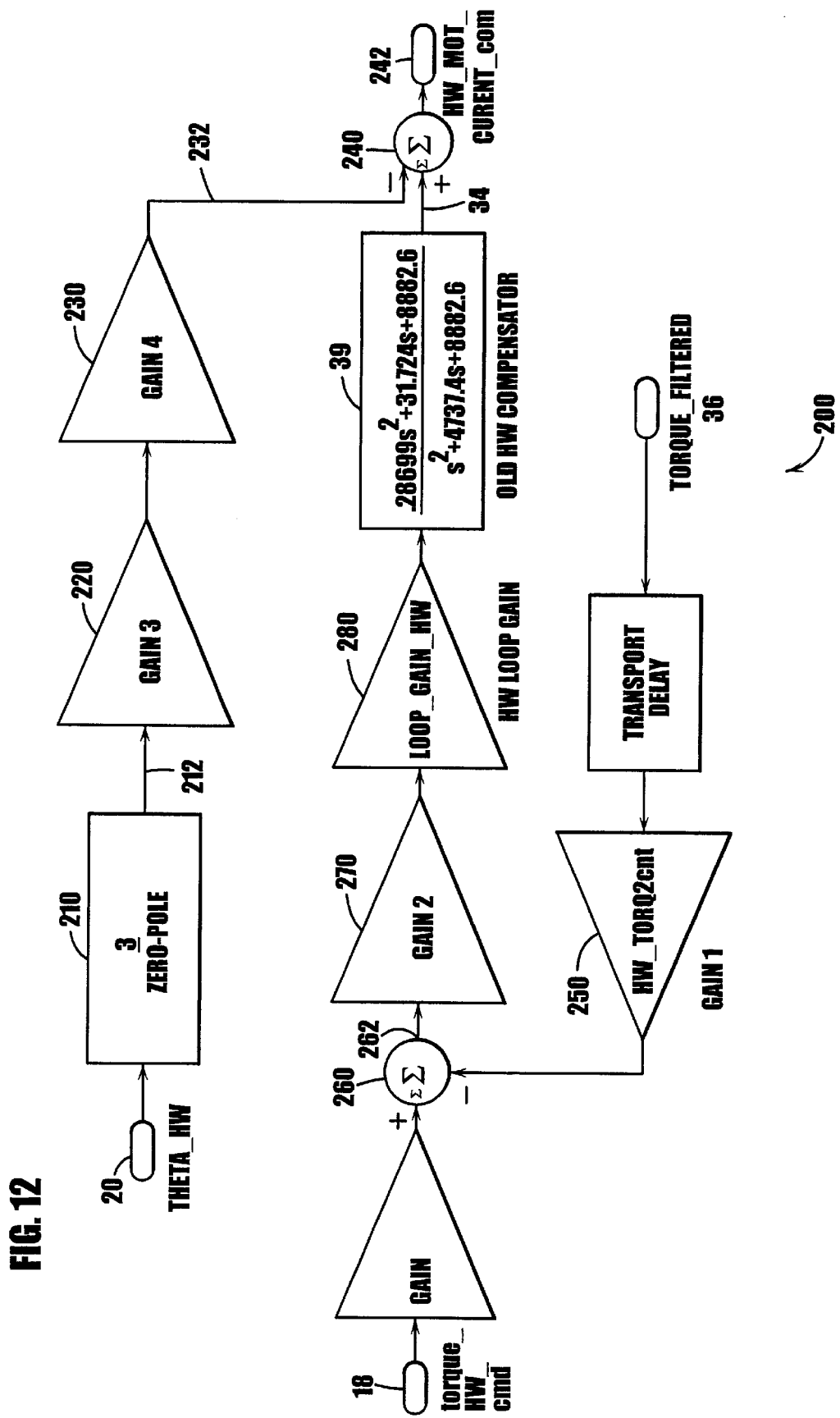
FIG. 12 is a block diagram depicting an implementation of a control algorithm for an exemplary embodiment of compensation using position to improve feel and stability.

Turning now to FIG. 12 as well, a block diagram depicts an implementation of a control algorithm 200 executed by a controller e.g., the steering wheel control unit 30, for implementing the exemplary embodiment. In the figure steering wheel position signal 20 (denoted theta_HW) is coupled into the steering wheel plant motor current command. The steering wheel position signal 20 is applied to a frequency-based compensator 210 and thereafter scaled at gains 220 and 230. The frequency-based compensator 210 includes, but is not limited to, frequency based filtering to manipulate the spectral content of the compensated steering wheel position signal 212. The scaling at gains 220 and 230 yield a position compensation signal 232 for combination with the existing compensated torque command signal 34. It is noteworthy to appreciate that this position compensation signal 232 is analogous to the force feedback discussed above in implementations of the road wheel control unit 38. The combination of the compensated torque command signal 34 (the motor command of earlier implementations) with the position compensation signal 232 depicted at summer 240 operate in conjunction to modify the spectral content of steering wheel feedback to the vehicle operator and ensure steering wheel system 14 loop stability.

Control algorithm 200 also includes a torque control path analogous to that discussed earlier for existing steer-by-wire systems 10. In an exemplary embodiment, the control algorithm 200 includes the enhancement of adding steering wheel position feedback to the torque control. In the figure, and similar to earlier configurations as described above, the feedback torque signal 36 (also denoted as torque_filtered) is scaled at gain 250 is combined with a scaled version of the steering wheel torque command signal 18 at summer 260 to formulate a torque error signal 262. The torque error signal 262 is scaled at gains 270 and 280 and then applied to a frequency based compensator 39 to formulate the compensated torque command 34, effectively the torque command signal 34 of earlier implementations. The combination of the compensated torque command signal 34 with the position compensation signal 232 depicted at summer 240 yields a position compensated torque command to the steering wheel plant dynamics unit 32. The combination of the torque command signal 34 with the position compensation signal 232 operate to modify the spectral content of steering wheel feedback to the vehicle operator and ensure steering wheel system 14 loop stability.

The frequency-based compensators 39 and 210 cooperate in the steering wheel unit 14 to maintain stability of the steering wheel plant dynamics unit 32. Therefore, by configuration of the frequency-based compensators 39 and 210 the characteristics of the steering wheel system 14 may be manipulated to provide desirable responses and maintain stability. In an exemplary embodiment, the frequency-based compensators 39 and 210 are configured to provide stability of the steering wheel system 14 at sufficient gains to achieve bandwidth greater than 3 Hz. It should also be noted that FIG. 12 depicts additional elements, connections, interconnections and the like. It will be appreciated that such configurations are commonly employed for implementation of a selected control configuration. For example, transport delays may be employed to ensure that date time coherency is addressed. Likewise, scaling may be employed to address unit conversions and the like.

It will be appreciated that while the disclosed embodiments refer to a configuration utilizing scaling in implementation, various alternatives will be apparent. It is well known that such gain amplifiers depicted may be implemented employing numerous variations, configurations, and topologies for flexibility. For example, the processes described above could employ in addition to or in lieu of scaling gains, look-up tables, direct algorithms, parameter scheduling or various other methodologies, which may facilitate execution of the desired functions, and the like, as well as combinations including at least one of the foregoing. In a similar manner, it will be appreciated that the frequency based compensation 39, and 210 may be implemented employing a variety of methods including but not limited to passive, active, discrete, digital, and the like, as well as combinations including at least one of the foregoing. More over the frequency-based compensator 210 and 39 as disclosed are illustrative of an exemplary embodiment and is not limiting as to the scope of what may be employed. It should also be noted, that in an exemplary embodiment frequency based compensator 210 is employed in the steering wheel position path. It should be evident that such frequency based compensation could also take the form of simple scaling, scheduling look-up tables and the like as desired to tailor the content or spectral content of the position signals employed as compensation. Such configuration would depend on the constraints of a particular control system and the level of compensation required to maintain stability and/or achieve the desired control loop response characteristics.

Turning now to the particulars of selecting the proper transfer function for the frequency based compensator 210. Referring to FIG. 12, an exemplary embodiment is depicted with a first-order transfer function with zero DC gain and a constant gain at frequencies above a cutoff. An advantageous feature of the exemplary embodiment disclosed herein is that it provides opportunity to tune the performance of the steering wheel system 14 and ultimately the steer-by-wire system 10 to satisfy a variety of desired characteristics.

Input Impedance Correction

Figure 13:
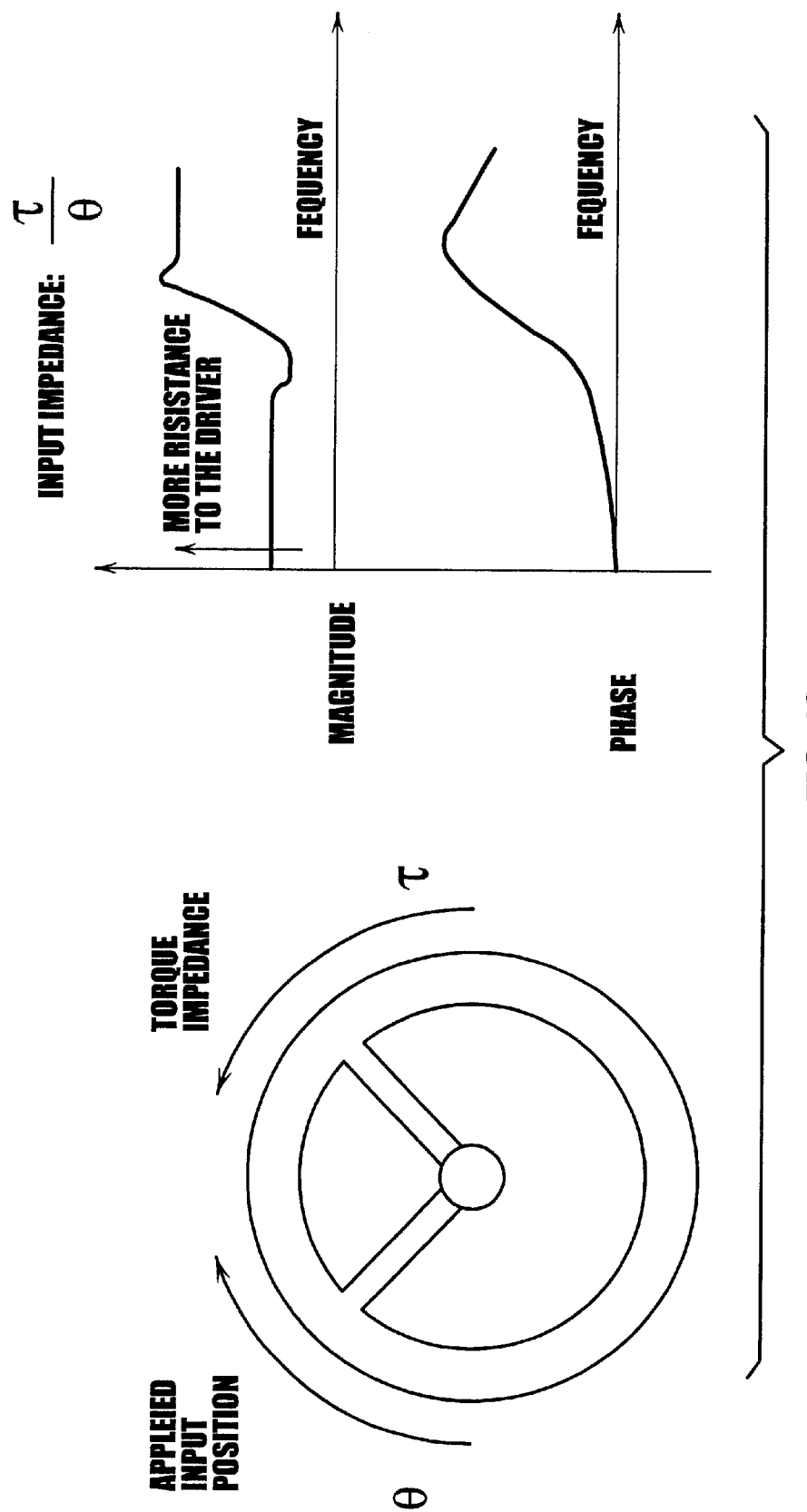
FIG. 13 is a diagrammatic depiction of input impedance.
Figure 14:
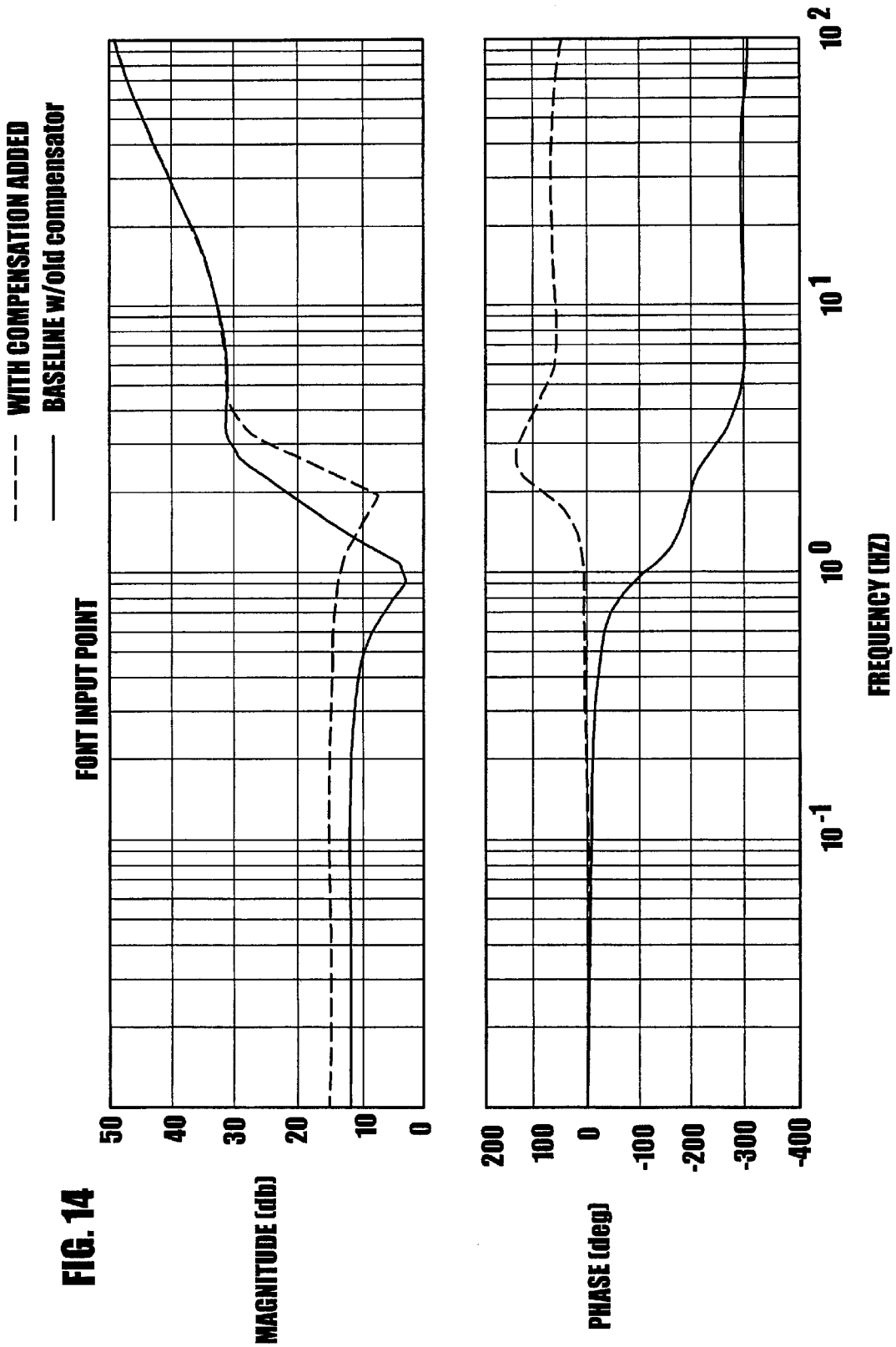
FIG. 14 is a Bode plot depicting an input impedance frequency response for an exemplary embodiment compared with an existing compensator.
Figure 16:
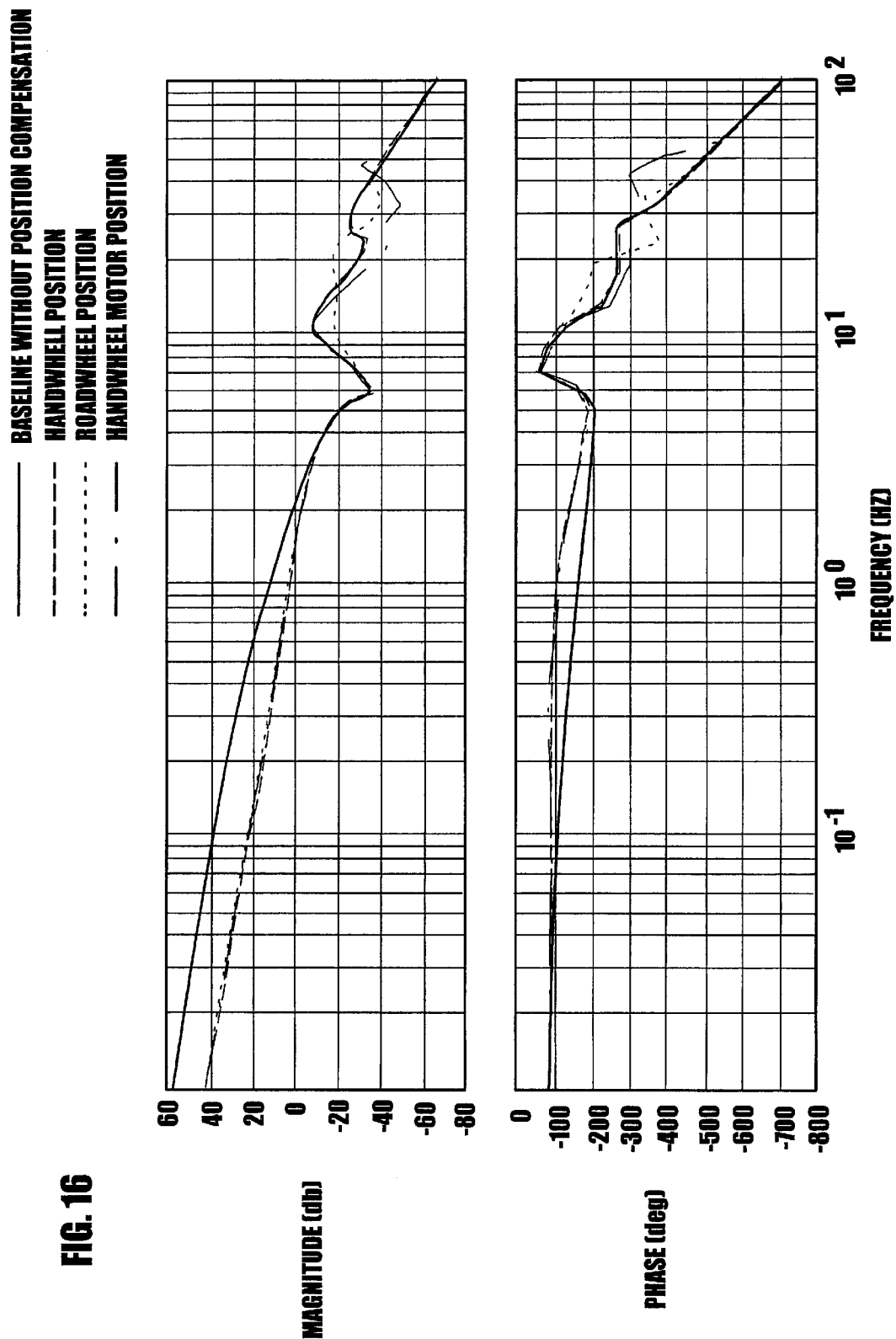
FIG. 16 is a Bode plot depicting an outer loop stability frequency response for various input signals.
Figure 17:
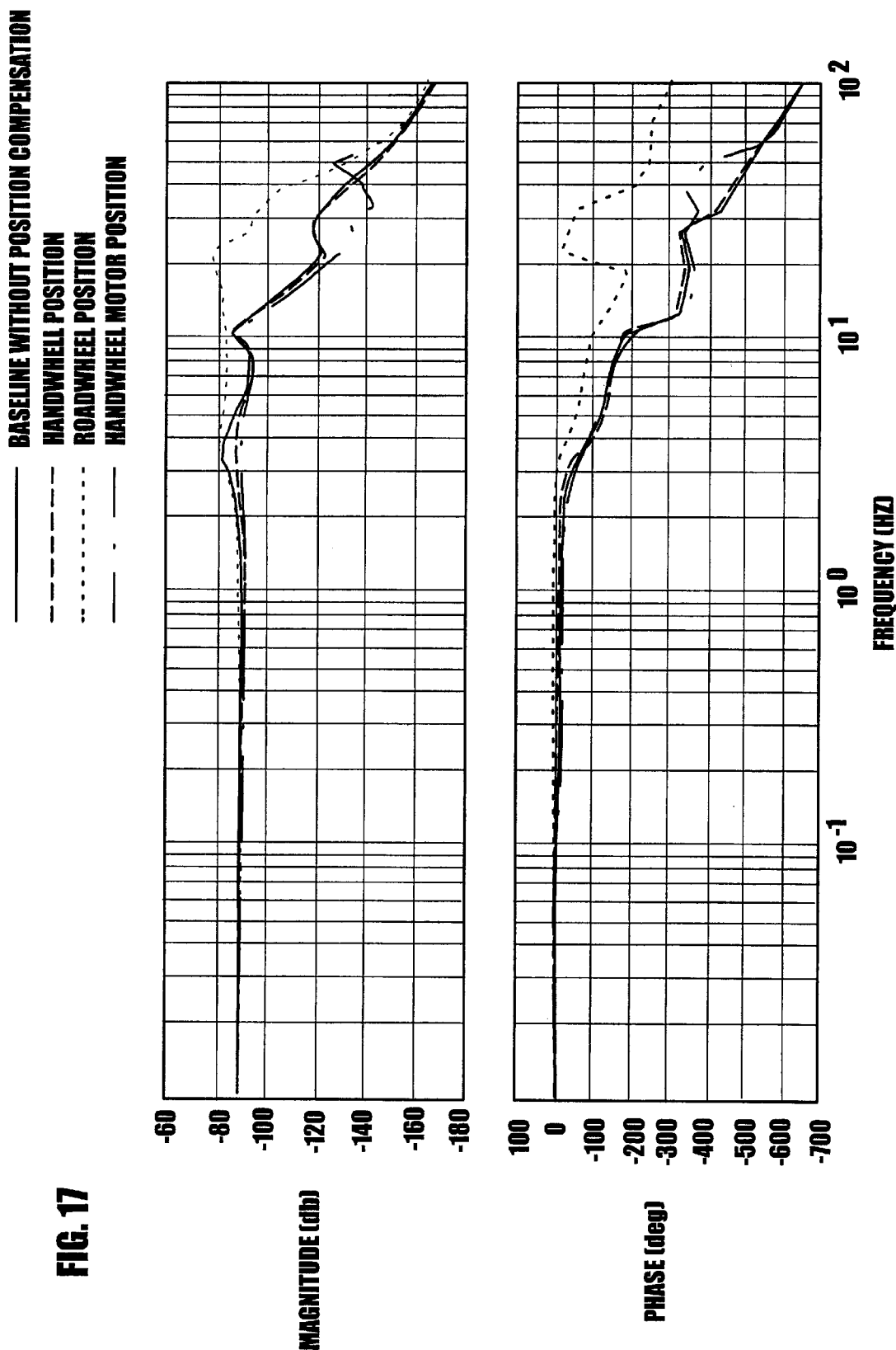
FIG. 17 is a Bode plot depicting road feel frequency response for various input signals.
Figure 18:
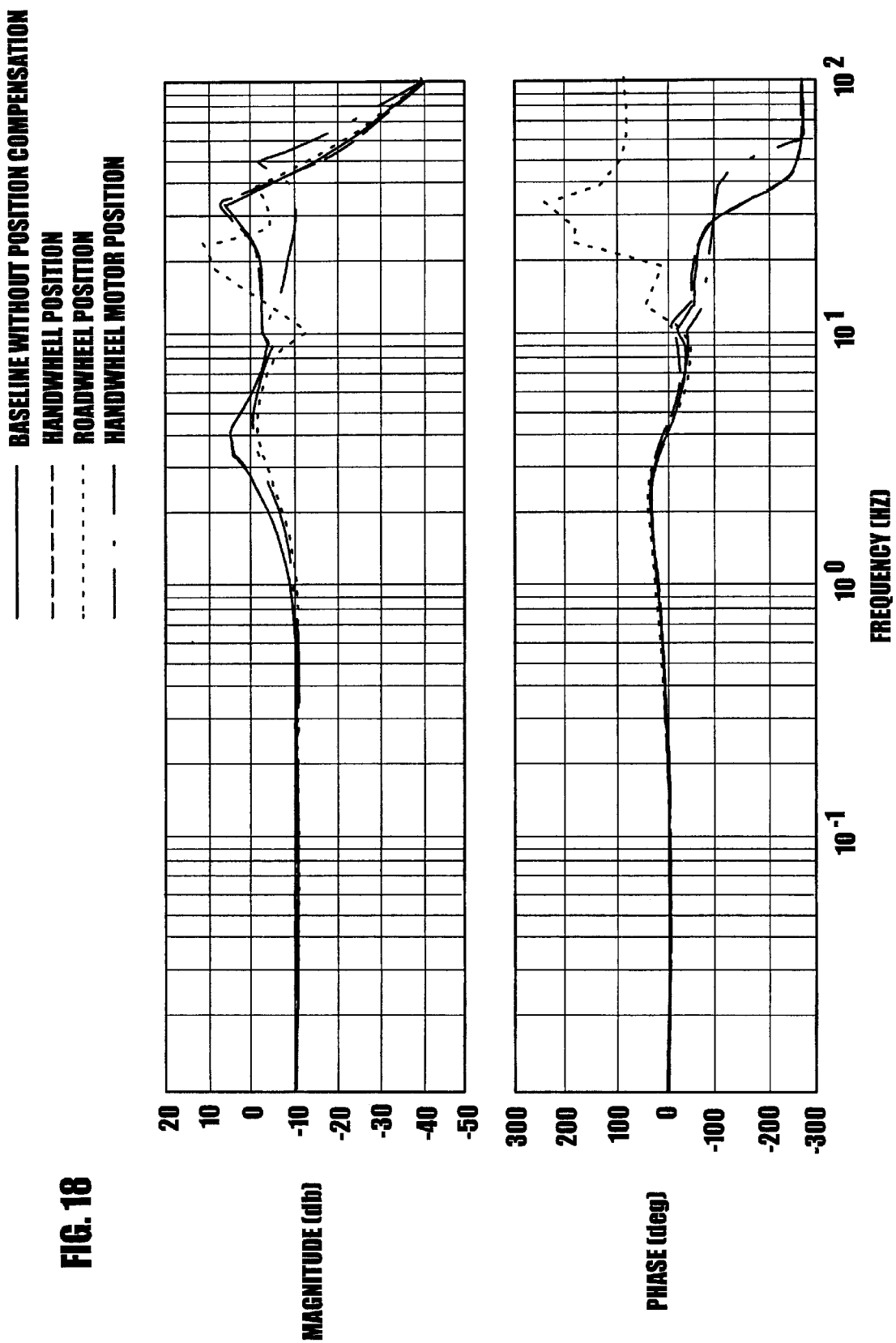
FIG. 18 is a Bode plot depicting a disturbance rejection frequency response for various input signals.

Turning now to FIG. 13 wherein a diagrammatic depiction of input impedance is provided. From a steering feel perspective, input impedance indicates the relationship between steering wheel angle applied by a driver and steering wheel torque felt in response. This relationship may be quantified by means of consideration of the frequency response characteristics as depicted in a frequency response plot as shown. For a steering system where the steering input (e.g., steering wheel) has a mechanical linkage to the road wheel, the general shape of the frequency response plots does not exhibit significant change. This may not be the case for other steering systems without a mechanical link.

It is also noteworthy to appreciate that increasing the bandwidth of the steering wheel system 14, road wheel system 16, or overall steer-by-wire system 10 also improves input impedance. As a result, a compensation means such as compensator 39 (as well as 130, and 210) may designed that increases the bandwidth of the steering wheel system 14, road wheel system 16, and/or the entire steer-by-wire system 10 and also changes the dynamic characteristics of the input impedance. Once again, bandwidth increases in one part of the system may provide for improved performance and/or relaxed requirements for other portions of the system. It should be evident that it is desirable to increase bandwidth in both the road wheel system 16 as well as the steering wheel system 14. As stated earlier, both road wheel system 16 and steering wheel system 14 loop bandwidths are important; if either is too low, it will result in undesirable performance. Referring to FIGS. 13–18, an existing steering control system is compared to one employing feedback as disclosed herein. From the figures, it can be seen that the addition of the feedback results in desired changes to input impedance.

Moreover, modifying the bandwidth of the steering wheel plant dynamics unit 32 (actuator) and the road wheel plant dynamics unit 42 (actuator) may also impact the input impedance in a desired way. Therefore, the input impedance dynamic response may vary by increasing the bandwidth of the steering wheel plant dynamics unit 32 (actuator) and/or the road wheel plant dynamics unit 42 (actuator). However, achieving a desirable input impedance with bandwidth improvements alone may be expensive and moreover, may result in other undesirable effects. By employing the exemplary embodiments disclosed herein; the feeding steering wheel position information into the steering wheel motor current command, and feeding force into the road wheel position control loop, additional improvements can be achieved beyond those provided by bandwidth increases alone, and it may be possible to achieve acceptable performance at a lower bandwidth. As a result, using this approach may actually reduce costs without impacting performance of the steer-by-wire system 10.

Yet, another noteworthy consideration is the selection of signals or parameters to be employed for the feedback. For example, for position feedback, the subject signals/parameters are steering wheel position, road wheel position, and steering wheel motor position e.g., position of the motor within the steering wheel dynamics unit 32. FIGS 15–18 depicts a comparison of input impedance dynamic response for the system using these three signals/parameters. All three signals result in similar input impedance characteristics, yet each exhibits significantly different results for disturbance rejection. Disturbance rejection is degraded for frequencies above 10 Hz when road wheel position is used compared to the baseline. In contrast, using steering wheel position results in an improvement in road feel and disturbance rejection in the 2–5 Hz range and similar performance for other frequencies when compared to a baseline. Finally, by using steering wheel motor position there are additional improvements. Here again benefit is seen in the 2–5 Hz range, but now there is also an improvement in the 10–40 Hz range for road disturbances, although there is a degradation in the 40–100 Hz range. There is a significant improvement in steering wheel motor disturbance rejection for frequencies above 10 Hz, with the peak being reduced and moved to a higher frequency.

In a particular implementation, the difference between steering wheel motor position when compared to steering wheel position may be attributed to the compliance of the torque sensor 31. This compliance will effectively attenuate the high frequency signals transmitted to and measured at the steering wheel. It is evident that having information directly from the motor would help in reducing the impact of motor disturbances because it is the information in closest proximity to the source of the disturbance and facilitates correction to be applied prior to transmission to the steering wheel. Given that steering wheel motor position gives better resolution than using steering wheel position and resulted in better disturbance rejection, in an exemplary embodiment, motor position was selected as the preferred signal/parameter for feedback, although other position signals could be utilized.

Yet, another enhancement achievable with implementation of the embodiments disclosed herein are improvements in steer-by-wire system performance related to error tracking. For the exemplary embodiments disclosed, as bandwidth of the road wheel system 16 or steering wheel system 14 is increased, an improvement in tracking the commanded input is evidenced. Such an improvement is further evidenced as improved tracking of the overall system. In other words, for a given input; the road wheel system, steering wheel system, and over all steer-by-wire system will follow or track that input more accurately. Reductions in tracking errors correspond to reductions in system errors and improvements in overall performance. Once again, improvements achieved by such an increase in bandwidth, resulting in an improvement in tracking error my permit reductions in requirements for other components and thereby, reductions in cost. For example, if tracking error is improved, a lower cost less accurate sensor may prove acceptable without impacting performance. Moreover, it will be appreciated that there are numerous advantages and improvements resultant from the bandwidth enhancements disclosed herein for a control system that are well known and now readily achievable.

It will be evident that there exist numerous numerical methodologies in the art for implementation of mathematical functions, in particular as referenced here, derivatives. While many possible implementations exist, a particular method of implementation should not be considered limiting.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium 60, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal 62 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A steer-by-wire control system comprising:
   a road wheel unit responsive to a road wheel command signal for steering a vehicle, said road wheel unit includes a road wheel position sensor to produce and transmit a road wheel position signal and a road wheel force sensor to produce and transmit a road wheel force signal;
   a steering wheel unit responsive to a steering wheel torque command signal, said steering wheel unit includes a steering wheel position sensor to produce and transmit a steering wheel position signal and a torque sensor to produce and transmit a feedback torque sensor signal;
   a vehicle speed sensor to produce and transmit a vehicle speed signal;
   a master control unit operatively connected to said vehicle speed sensor, said steering wheel unit, and said road wheel unit; and
   wherein said steering wheel unit is also responsive to said steering wheel position signal.

2. The steer-by-wire control system of claim 1 wherein said steering wheel unit exhibits a bandwidth sufficient to facilitate said master control unit maintaining stability of said steer-by-wire system.

3. The steer-by-wire control system of claim 1 wherein said steering wheel unit comprises a closed loop control system responsive to said steering wheel torque command signal said feedback torque sensor signal and said steering wheel position signal.

4. The steer-by-wire control system of claim 1 wherein at least one of said road wheel position sensor, said road wheel force sensor, said steering wheel position sensor, said torque sensor, and said vehicle speed sensor is selected and configured to ensure that at least one of said road wheel unit, said steering wheel unit, and said steer-by-wire system, exhibits selected performance characteristics.

5. The steer-by-wire control system of claim 4 wherein said selected performance characteristics include at least one of increased bandwidth, increased disturbance rejection, improved input impedance response, increased resolution and increased tracking accuracy over a steer-by-wire system not employing a steering wheel unit responsive to said steering wheel position.

6. The steer-by-wire control system of claim 1 wherein said steering wheel position sensor is selected from at least one of a steering wheel position sensor located in the vicinity of a steering wheel, a steering wheel motor position sensor located in a motor configured to manipulate said steering wheel, and road wheel position sensor located in a vicinity of a road wheel.

7. The steer-by-wire control system of claim 6 wherein said steering wheel position sensor is selected, positioned, and configured such that it exhibits selected performance characteristics.

8. The steer-by-wire control system of claim 7 wherein said selected performance characteristics include at least one of accuracy, resolution, and bandwidth.

9. The steer-by-wire control system of claim 1 wherein said steering wheel unit comprises a steering wheel control unit and a steering wheel plant dynamics unit.

10. The steer-by-wire control system of claim 9 wherein:
said steering wheel control unit is responsive to said steering wheel torque command signal, said feedback torque sensor signal, and said steering wheel position signal, and generates a position compensated torque command signal;
said steering wheel plant dynamics unit is responsive to said position compensated torque command signal and provides a reaction torque in response thereto to an operator; and
wherein said steering wheel plant dynamics unit comprises a motor configured to generate said reaction torque.

11. The steer-by-wire control system of claim 10 wherein said position compensated torque command signal comprises a combination of a torque command signal and a position compensation signal.

12. The steer-by-wire control system of claim 11 wherein said combination comprises a summation.

13. The steer-by-wire control system of claim 11 wherein said torque command signal is responsive to a frequency based compensator configured to characterize content of said position compensated torque command signal to enhance input impedance of said steer-by-wire system.

14. The steer-by-wire control system of claim 11 wherein said position compensation signal is responsive to a frequency based compensator configured to characterize content of said position compensated torque command signal to enhance input impedance of said steer-by-wire system.

15. The steer-by-wire control system of claim 11 wherein said torque command signal is responsive to a frequency based compensator configured to characterize content of said position compensated torque command signal to reduce free control oscillation of said steer-by-wire system.

16. The steer-by-wire control system of claim 11 wherein said position compensation signal is responsive to a frequency based compensator configured to characterize content of said position compensated torque command signal to reduce free control oscillation of said steer-by-wire system.

17. The steer-by-wire control system of claim 11 wherein said torque command signal is responsive to a frequency based compensator configured to characterize content of said position compensated torque command signal to increase the bandwidth of said steering wheel unit.

18. The steer-by-wire control system of claim 17 wherein said steering wheel unit exhibits a bandwidth of at least one Hertz.

19. The steer-by-wire control system of claim 18 wherein said steering wheel unit exhibits a bandwidth of about ten Hertz.

20. The steer-by-wire control system of claim 11 wherein said torque command signal is responsive to a frequency based compensator configured to characterize content of said position compensated torque command signal to maintain stability of said steering wheel unit.

21. The steer-by-wire control system of claim 11 wherein said position compensation signal is responsive to a frequency based compensator configured to characterize content of said position compensated torque command signal to increase the bandwidth of said steering wheel unit.

22. The steer-by-wire control system of claim 21 wherein said steering wheel unit exhibits a bandwidth of at least one Hertz.

23. The steer-by-wire control system of claim 22 wherein said steering wheel unit exhibits a bandwidth of about ten Hertz.

24. The steer-by-wire control system of claim 11 wherein said position compensation signal is responsive to a frequency based compensator configured to characterize content of said position compensated torque command signal to maintain stability of said steering wheel unit.

25. The steer-by-wire control system of claim 11 wherein said steering wheel control unit includes a frequency based compensator configured to characterize spectral content of said torque command signal such that said steering wheel unit exhibits a bandwidth sufficient to facilitate generation of a steering wheel torque command signal by said torque control unit to maintain stability of said steer-by-wire system.

26. The steer-by-wire control system of claim 11 wherein said steering wheel control unit includes a frequency based compensator configured to characterize spectral content of said position compensation signal such that said steering wheel unit exhibits a bandwidth sufficient to facilitate generation of a steering wheel torque command signal by said torque control unit to maintain stability of said steer-by-wire system.

27. A steer-by-wire control system comprising:
a road wheel unit responsive to a road wheel command signal for steering a vehicle, said road wheel unit includes a road wheel position sensor to produce and transmit a road wheel position signal and a road wheel force sensor to produce and transmit a road wheel force signal;

a steering wheel unit responsive to a steering wheel torque command signal, said steering wheel unit includes a steering wheel position sensor to produce and transmit a steering wheel position signal and a torque sensor to produce and transmit a feedback torque sensor signal;

a vehicle speed sensor to produce and transmit a vehicle speed signal;

a master control unit operatively connected to said vehicle speed sensor, said steering wheel unit, and said road wheel unit;

wherein said steering wheel unit is also responsive to said steering wheel position; and wherein said master control unit calculates said road wheel command signal in response to said vehicle speed signal, said feedback torque sensor signal and said steering wheel position signal; and said master control unit calculates said steering wheel torque command signal responsive to a composite road wheel force signal, said feedback torque sensor signal, said steering wheel position signal and said vehicle speed signal.

28. A method for steering a vehicle with a steer-by-wire system comprising:

receiving a road wheel force signal;

receiving a road wheel position signal;

receiving a vehicle speed signal;

receiving a steering wheel position signal;

receiving a feedback torque sensor signal;

generating a steering wheel torque command signal responsive to said road wheel force signal, said vehicle speed signal, and said feedback torque sensor signal;

generating a road wheel command signal responsive to said road wheel position signal, said vehicle speed signal, said feedback torque sensor signal, and said steering wheel position signal; and generating a position compensated torque command signal in a steering wheel unit responsive to said steering wheel position signal.

29. The method for steering a vehicle of claim 28 wherein said generating a position compensated torque command signal in a steering wheel unit is such that said steering wheel unit exhibits a bandwidth sufficient to facilitate a master control unit generating said steering wheel torque command signal to maintain stability of said steer-by-wire system.

30. The method for steering a vehicle of claim 28 wherein said steering wheel torque command signal and said feedback torque sensor signal, and said steering wheel position signal from a steering wheel position sensor are employed in a steering wheel unit comprising a closed loop control system responsive thereto.

31. The method for steering a vehicle of claim 28 wherein at least one of said road wheel position signal, said road wheel force signal, said steering wheel position signal, said feedback torque sensor signal, and said vehicle speed signal are responsive to a road wheel position sensor, a road wheel force sensor, a steering wheel position sensor, a torque sensor, and a vehicle speed sensor respectively, selected and configured to ensure that at least one of a road wheel unit, a steering wheel unit, and said steer-by-wire system, exhibits selected performance characteristics.

32. The method for steering a vehicle of claim 31 wherein said selected performance characteristics include at least one of increased bandwidth, increased disturbance rejection, improved input impedance response, increased resolution and increased tracking accuracy over a steer-by-wire system not employing a steering wheel unit responsive to said steering wheel position.

33. The method for steering a vehicle of claim 28 wherein said steering wheel position sensor is selected from at least one of a steering wheel position sensor located in the vicinity of a steering wheel, a steering wheel motor position sensor located in a motor configured to manipulate said steering wheel, and road wheel position sensor located in a vicinity of a road wheel.

34. The method for steering a vehicle of claim 33 wherein said steering wheel position signals selected, positioned and configured such that said steering wheel position signal exhibits selected performance characteristics.

35. The method for steering a vehicle of claim 34 said selected performance characteristics include at least one of accuracy, resolution, and bandwidth.

36. The method for steering a vehicle of claim 28 wherein said steering wheel unit comprises a steering wheel control unit and a steering wheel plant dynamics unit.

37. The method for steering a vehicle of claim 36 wherein:

said position compensated torque command signal is generated in a steering wheel control unit responsive to said steering wheel torque command signal, said steering wheel position signal, and said feedback torque sensor signal;

said steering wheel plant dynamics unit is responsive to said position compensated torque command signal and provides a reaction torque in response thereto to an operator; and wherein said steering wheel plant dynamics unit comprises a motor configured to position a steering wheel thereby generating said reaction torque.

38. The method for steering a vehicle of claim 37 wherein said position compensated torque command signal comprises a combination of a torque command signal and a position compensation signal.

39. The method for steering a vehicle of claim 38 wherein said combination comprises a summation.

40. The method for steering a vehicle of claim 38 wherein said position compensation signal is responsive to frequency based compensation to characterize spectral content of said position compensated torque command signal to enhance input impedance of said steer-by-wire system.

41. The method for steering a vehicle of claim 40 wherein said steering wheel unit exhibits a bandwidth of about ten Hertz.

42. The method for steering a vehicle of claim 38 wherein said torque command signal is responsive to frequency based compensation to characterize spectral content of said position compensated torque command signal to enhance input impedance of said steer-by-wire system.

43. The method for steering a vehicle of claim 38 wherein said position compensation signal is responsive to frequency based compensation to characterize spectral content of said position compensated torque command signal to reduce free control oscillation of said steer-by-wire system.

44. The method for steering a vehicle of claim 38 wherein said torque command signal is responsive to frequency based compensation to characterize spectral content of said position compensated torque command signal to reduce free control oscillation of said steer-by-wire system.

45. The method for steering a vehicle of claim 38 wherein said position compensation signal is responsive to frequency based compensation to characterize spectral content of said position compensated torque command signal to maintain stability of said steering wheel unit.

46. The method for steering a vehicle of claim 38 wherein said position compensation signal is responsive to frequency based compensation to characterize spectral content of said position compensated torque command signal to increase bandwidth of said steering wheel unit.

47. The method for steering a vehicle of claim 46 wherein said steering wheel unit exhibits a bandwidth of at least one Hertz.

48. The method for steering a vehicle of claim 47 wherein said steering wheel unit exhibits a bandwidth of about ten Hertz.

49. The method for steering a vehicle of claim 38 wherein said torque command signal is responsive to frequency based compensation to characterize spectral content of said position compensated torque command signal to maintain stability of said steering wheel unit.

50. The method for steering a vehicle of claim 38 wherein said torque command signal is responsive to frequency based compensation to characterize spectral content of said position compensated torque command signal to increase bandwidth of said steering wheel unit.

51. The method for steering a vehicle of claim 50 wherein said steering wheel unit exhibits a bandwidth of at least one Hertz.

52. The method for steering a vehicle of claim 38 wherein said steering wheel control unit includes a frequency based compensator configured to characterize spectral content of said torque command signal such that said steering wheel unit exhibits a bandwidth sufficient to facilitate generation of a steering wheel torque command signal by said torque control unit to maintain stability of said steer-by-wire system.

53. The method for steering a vehicle of claim 38 wherein said steering wheel control unit includes a frequency based compensator configured to characterize spectral content of said position compensation signal such that said steering wheel unit exhibits a bandwidth sufficient to facilitate generation of a steering wheel torque command signal by said torque control unit to maintain stability of said steer-by-wire system.

54. A torque control system responsive to position comprising:
a torque control unit responsive to a torque command signal for controlling torque, said torque control unit includes a position sensor to produce and transmit a position signal and a torque sensor to produce and transmit a torque sensor signal;
wherein said torque control unit comprises a closed loop control system responsive to said torque command signal and said torque sensor signal as feedback;
wherein said torque control unit includes feedforward control based on said position signal;
wherein at least one of said position sensor, and said torque sensor, is selected and configured to ensure that at least one of said torque control unit, and said torque control system, exhibits selected performance characteristics; and
wherein said selected performance characteristics include at least one of increased bandwidth, increased disturbance rejection, improved input impedance response, increased resolution and increased tracking accuracy over a torque control system not employing a torque control unit responsive to said position sensor.

55. The torque control system of claim 54 wherein said torque command signal is generated by a master control unit operatively connected to said torque control unit.

56. The torque control system of claim 54 wherein said position sensor is selected from at least one of a position sensor located in the vicinity of an operator mechanical input, a motor position sensor located in a motor configured to manipulate said operator mechanical input, and a position sensor located in a vicinity of a mechanical response to said motor.

57. The torque control system of claim 56 wherein said position sensor is selected, positioned, and configured such that said position signal exhibits selected performance characteristics.

58. The torque control system of claim 57 wherein said selected performance characteristics include at least one of accuracy, resolution, and bandwidth.

59. The torque control system of claim 54 wherein said torque control unit comprises a control unit and a plant dynamics unit.

60. The torque control system of claim 59 wherein:
said control unit is responsive to said master torque command signal, said torque sensor signal, and said steering wheel position signal, and generates a position compensated torque command signal;
said plant dynamics unit is responsive to said position compensated torque command signal and provides a reaction torque in response thereto; and
wherein said plant dynamics unit comprises a motor configured to generate said reaction torque.

61. The torque control system of claim 60 wherein said position compensated torque command signal comprises a combination of a torque command signal and a position compensation signal.

62. The torque control system of claim 61 wherein said combination comprises a summation.

63. The torque control system of claim 61 wherein said torque command signal is responsive to a frequency based compensator configured to characterize content of said position compensated torque command signal to enhance input impedance of said torque control system.

64. The torque control system of claim 61 wherein said position compensation signal is responsive to a frequency based compensator configured to characterize content of said position compensated torque command signal to enhance input impedance of said torque control system.

65. The torque control system of claim 61 wherein said torque command signal is responsive to a frequency based compensator configured to characterize content of said position compensated torque command signal to reduce free control oscillation of said torque control system.

66. The torque control system of claim 61 wherein said position compensation signal is responsive to a frequency based compensator configured to characterize content of said position compensated torque command signal to reduce free control oscillation of said torque control system.

67. The torque control system of claim 61 wherein said torque command signal is responsive to a frequency based compensator configured to characterize content of said position compensated torque command signal to increase the bandwidth of said torque control unit.

68. The torque control system of claim 67 wherein said torque control unit exhibits a bandwidth of at least one Hertz.

69. The torque control system of claim 68 wherein said torque control unit exhibits a bandwidth of about ten Hertz.

70. The torque control system of claim 63 wherein said torque command signal is responsive to a frequency based compensator configured to characterize content of said position compensated torque command signal to maintain stability of said torque control unit.

71. The torque control system of claim 61 wherein said position compensation signal is responsive to a frequency based compensator configured to characterize content of said position compensated torque command signal to increase the bandwidth of said torque control unit.

72. The torque control system of claim 71 wherein said steering wheel unit exhibits a bandwidth of at least one Hertz.

73. The torque control system of claim 72 wherein said torque control unit exhibits a bandwidth of about ten Hertz.

74. The torque control system of claim 61 wherein said position compensation signal is responsive to a frequency based compensator configured to characterize content of said position compensated torque command signal to maintain stability of said torque control unit.

75. The torque control system of claim 61 wherein said torque control unit includes a frequency based compensator configured to characterize spectral content of said position compensation signal such that said torque control unit exhibits a bandwidth sufficient to facilitate generation of a master torque command signal by said master control unit to maintain stability of said torque control system.

76. The torque control system of claim 61 wherein said torque control unit includes a frequency based compensator configured to characterize spectral content of said torque command signal such that said torque control unit exhibits a bandwidth sufficient to facilitate generation of a master torque command signal by said master control unit to maintain stability of said torque control system.

77. A method for controlling torque with a torque control system responsive to position, the method comprising:
   receiving a position signal from a position sensor;
   receiving a torque sensor signal;
   receiving a master torque command signal;
   generating a position command torque signal in a torque control unit responsive to said master torque command signal, said torque sensor signal, and said position signal;
   wherein said position compensated torque command signal, said position signal, and said torque sensor signal are employed in a torque control unit forming a control system;
   wherein at least one of said position signal and said torque sensor signal are responsive to a position sensor and a torque sensor respectively, selected and configured to ensure that at least one of a torque control unit and said torque control system, exhibits selected performance characteristics; and
   wherein said selected performance characteristics include at least one of increased bandwidth, increased disturbance rejection, improved input impedance response, increased resolution and increased tricking accuracy over a torque control system not employing a torque control unit responsive to said position sensor.

78. The method for controlling torque of claim 77 wherein said master torque command signal is generated by a master control unit operatively connected to said torque control unit forming a closed loop control system with said torque control unit.

79. The method for controlling torque of claim 77 wherein said position sensor is selected from at least one of a position sensor located in the vicinity of an operator input device, a motor position sensor located in a motor configured to manipulate said operator input device, and a position sensor located in a vicinity of a mechanical response to said motor.

80. The method for controlling torque of claim 79 wherein said position signal is selected, positioned, and configured such that said position signal exhibits selected performance characteristics.

81. The method for controlling torque of claim 80 wherein said selected performance characteristics include at least one of accuracy, resolution, and bandwidth.

82. The method for controlling torque of claim 77 wherein said torque control unit comprises a control unit and a plant dynamics unit.

83. The method for controlling torque of claim 82 wherein:
   said position compensated torque command signal is generated in a control unit responsive to said master torque command signal, said position signal, and said torque sensor signal;
   said plant dynamics unit is responsive to said position compensated torque command signal and provides a reaction torque in response thereto; and
   wherein said plant dynamics unit comprises a motor configured to generate said reaction torque.

84. The method for controlling torque of claim 83 wherein said position compensated torque command signal comprises a combination of a torque command signal and a position compensation signal.

85. The method for controlling torque of claim 84 wherein said combination comprises a summation.

86. The method for controlling torque of claim 84 wherein said torque command signal is responsive to frequency-based compensation to characterize spectral content of said position compensated torque command signal to enhance input impedance of said torque control unit.

87. The method for controlling torque of claim 84 wherein said position compensation signal is responsive to frequency-based compensation to characterize spectral content of said position compensated torque command signal to enhance input impedance of said torque control unit.

88. The method for controlling torque of claim 84 wherein said torque command signal is responsive to frequency-based compensation to characterize spectral content of said position compensated torque command signal reduce free control oscillation of said torque control unit.

89. The method for controlling torque of claim 84 wherein said position compensation signal is responsive to frequency-based compensation to characterize spectral content of said position compensated torque command signal to reduce free control oscillation of said torque control unit.

90. The method for controlling torque of claim 84 wherein said position compensation signal is responsive to frequency-based compensation to characterize spectral content of said position compensated torque command signal to maintain stability of said torque control unit.

91. The method for controlling torque of claim 84 wherein said position compensation signal is responsive to frequency-based compensation to characterize spectral content of said position compensated torque command signal to increase bandwidth of said torque control unit.

92. The method for controlling torque of claim 91 wherein said torque control unit exhibits a bandwidth of at least one Hertz.

93. The method for controlling torque of claim 92 wherein said torque control unit exhibits a bandwidth of about ten Hertz.

94. The method for controlling torque of claim 84 wherein said torque command signal is responsive to frequency-based compensation to characterize spectral content of said position compensated torque command signal to maintain stability of said torque control unit.

95. The method for controlling torque of claim 84 wherein said torque command signal is responsive to frequency-based compensation to characterize spectral content of said position compensated torque command signal to increase bandwidth of said torque control unit.

96. The method for controlling torque of claim 95 wherein said torque control unit exhibits a bandwidth of at least one Hertz.

97. The method for controlling torque of claim 96 wherein said torque control unit exhibits a bandwidth of about ten Hertz.

98. The method for controlling torque of claim 84 wherein said torque control unit includes a frequency based compensator configured to characterize spectral content of said force compensation signal such that said torque control unit exhibits a bandwidth sufficient to facilitate generation of a master torque command signal by said master control unit to maintain stability of said torque control system.

99. The method for controlling torque of claim 84 wherein said torque control unit includes a frequency based compensator configured to characterize spectral content of said position command signal such that said torque control unit exhibits a bandwidth sufficient to facilitate generation of a master torque command signal by said master control unit to maintain stability of said torque control system.

100. A storage medium:
   encoded with a machine readable computer program code;
   said code including instructions for causing a computer to implement a method for steering a vehicle with a steer-by-wire system, the method comprising:
      receiving a road wheel force signal;
      receiving a road wheel position signal;
      receiving a vehicle speed signal;
      receiving a steering wheel position signal;
      receiving a feedback torque sensor signal;
      generating a steering wheel torque command signal responsive to said road wheel force signal, said vehicle speed signal, and said feedback torque sensor signal;
      generating a road wheel command signal responsive to said road wheel position signal, said vehicle speed signal, said feedback torque sensor signal, and said steering wheel position signal; and
      generating a position compensated torque command signal in a steering wheel unit responsive to said steering wheel position signal.

101. A computer data signal, said computer data signal comprising:
   instructions for causing a computer to implement a method for steering a vehicle with a steer-by-wire system, the method comprising:
      receiving a road wheel force signal;
      receiving a road wheel position signal;
      receiving a vehicle speed signal;
      receiving a steeling wheel position signal;
      receiving a feedback torque sensor signal;
      generating a steering wheel torque command signal responsive to said road wheel force signal, said vehicle speed signal, and said feedback torque sensor signal;
      generating a road wheel command signal responsive to said road wheel position signal, said vehicle speed signal, said feedback torque sensor signal, and said steering wheel position signal; and
      generating a position compensated torque command signal in a steering wheel unit responsive to said steering wheel position signal.

102. A storage medium:
   encoded with a machine readable computer program code;
   said code including instructions for causing a computer to implement a method for controlling torque with a torque control system responsive to position, the method comprising:
      receiving a position signal from a position sensor;
      receiving a torque sensor signal;
      receiving a master torque command signal;
      generating a position compensated torque command signal in a torque control unit responsive to said master torque command signal, said torque sensor signal, and said position signal;
      wherein said position compensated torque command signal, said position signal, and said torque signal are employed in a torque control unit forming a control system;
      wherein at least one of said position signal and said torque sensor signal are responsive to a position sensor and a torque sensor respectively, selected and configured to ensure that at least one of a torque control unit and said torque control system, exhibits selected performance characteristics; and
      wherein said selected performance characteristics include at least one of increased bandwidth, increased disturbance rejection, improved input impedance response, increased resolution and increased tracking accuracy over a torque control system not employing a torque control unit responsive to said position sensor.

103. A computer data signal, said computer data signal comprising:
   instructions for causing a computer to implement a method for controlling torque with a torque control system responsive to position, the method comprising:
      receiving a position signal from a position sensor;
      receiving a torque sensor signal;
      receiving a master torque command signal;
      generating a position compensated torque command signal in a torque control unit responsive to said master torque command signal, said torque sensor signal, and said position signal;
      wherein said position compensated torque command signal, said position signal, and said torque signal are employed in a torque control unit forming a control system;
      wherein at least one of said position signal and said torque sensor signal are responsive to a position sensor and a torque sensor respectively, selected and configured to insure that at least one of a torque control unit and said torque control system, exhibits selected performance characteristics; and
      wherein said selected characteristics include at least one of increased bandwidth, increased disturbance rejection, improved input impedance response, increased resolution and increased tracking accuracy over a torque control system not employing a torque control unit responsive to said position sensor.

* * * * *